(12) United States Patent
Olgiati et al.

(10) Patent No.: US 11,468,365 B2
(45) Date of Patent: Oct. 11, 2022

(54) GPU CODE INJECTION TO SUMMARIZE MACHINE LEARNING TRAINING DATA

(71) Applicant: Amazon Technologies, Inc., Seattle, WA (US)

(72) Inventors: Andrea Olgiati, Gilroy, CA (US); Rahul Raghavendra Huilgol, Sunnyvale, CA (US); Vikas Kumar, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 514 days.

(21) Appl. No.: 16/588,930

(22) Filed: Sep. 30, 2019

(65) Prior Publication Data

US 2021/0097432 A1    Apr. 1, 2021

(51) Int. Cl.
*G06N 20/00* (2019.01)
*G06T 1/20* (2006.01)
*G06F 17/18* (2006.01)

(52) U.S. Cl.
CPC ............ *G06N 20/00* (2019.01); *G06F 17/18* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 10,089,581 B2 | 10/2018 | Flores et al. | |
| 10,163,061 B2 | 12/2018 | Grove et al. | |
| 10,313,441 B2 | 6/2019 | Moiyallah, Jr. et al. | |
| 10,354,203 B1 | 7/2019 | Carr et al. | |
| 2017/0372232 A1 | 12/2017 | Maughan et al. | |
| 2018/0232657 A1 | 8/2018 | Acharya et al. | |
| 2018/0285691 A1 | 10/2018 | Grindstaff et al. | |
| 2018/0285772 A1 | 10/2018 | Gopalan | |
| 2019/0087639 A1 | 3/2019 | Crane | |
| 2019/0095756 A1 | 3/2019 | Agrawal et al. | |
| 2019/0108417 A1 | 4/2019 | Talagala et al. | |
| 2019/0156247 A1* | 5/2019 | Faulhaber, Jr. | G06N 3/08 |

(Continued)

OTHER PUBLICATIONS

Eric Breck et al, "Data Validation For Machine Learning", pp. 1-14.

(Continued)

*Primary Examiner* — Nurun Flora
(74) *Attorney, Agent, or Firm* — Robert C. Kowert; Kowert, Hood, Munyon, Rankin & Goetzel, P.C.

(57) ABSTRACT

Methods, systems, and computer-readable media for GPU code injection to summarize machine learning training data are disclosed. Training of a machine learning model is initiated using a graphics processing unit (GPU) associated with a machine learning training cluster. The training of the machine learning model generates tensor data in a memory of the GPU. The GPU determines a summary of the tensor data according to a reduction operator. The summary is smaller in size than the tensor data and is output by the GPU. A machine learning analysis system performs an analysis of the training of the machine learning model based at least in part on the summary of the tensor data. The machine learning analysis system detects one or more conditions associated with the training of the machine learning model based at least in part on the analysis.

20 Claims, 22 Drawing Sheets

(56) References Cited

U.S. PATENT DOCUMENTS

| | | | |
|---|---|---|---|
| 2019/0209022 A1 | 7/2019 | Sobol et al. | |
| 2019/0377984 A1 | 12/2019 | Ghanta et al. | |
| 2020/0034665 A1 | 1/2020 | Ghanta et al. | |
| 2020/0172407 A1* | 6/2020 | Yoshida | A61K 8/27 |
| 2021/0097431 A1* | 4/2021 | Olgiati | G06N 5/046 |
| 2021/0304066 A1* | 9/2021 | Tomioka | G06N 3/105 |
| 2022/0051104 A1* | 2/2022 | Interlandi | G06N 3/0454 |

OTHER PUBLICATIONS

Vadim Fedorov, "Should I use Amazon SageMaker for Deep Learning?", Jan. 25, 2018, pp. 1-11.

Cassie Kozyrkov, "9 Things You Should Know About TensorFlow", Aug. 3, 2018, pp. 1-15.

Clemens Mewald et al, "Introducing TensorFlow Data Validation: Data Understanding, Validation, and Monitoring at Scale," Sep. 10, 2018, pp. 1-8.

Amit Mukherjee et al, "Building, training, and deploying fastai models with Amazon SageMaker," AWS Blog, Amazon.com, Jul. 25, 2019, pp. 1-8.

Sebastian Schelter et al., "Automating Large-Scale Data Quality Verification," Proceedings of the VLDB Endowment, vol. 11, No. 12, Aug. 2018, pp. 1-14.

U.S. Appl. No. 16/588,952, filed Sep. 30, 2019, Andrea Olgiati.

U.S. Appl. No. 16/588,913, filed Sep. 30, 2019, Andrea Olgiati.

Agnese Pinto, et al., "A semantic-based approach for Machine Learning data analysis," Proceedings of the 2015 IEEE 9th International Conference on Semantic Computing (IEEE ICSC 2015), Feb. 7-9, 2015, pp. 324-327.

* cited by examiner

US 11,468,365 B2

GPU CODE INJECTION TO SUMMARIZE MACHINE LEARNING TRAINING DATA

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. As another example, a distributed system may use machine learning models that are trained, tested, and then used to predict future behaviors. If a model fails to produce useful or accurate predictions, it is often the responsibility of a user to manually examine the model (or related data) to determine where the failure occurred. Such manual tasks may be time-consuming and prone to additional human error.

Figure 1:
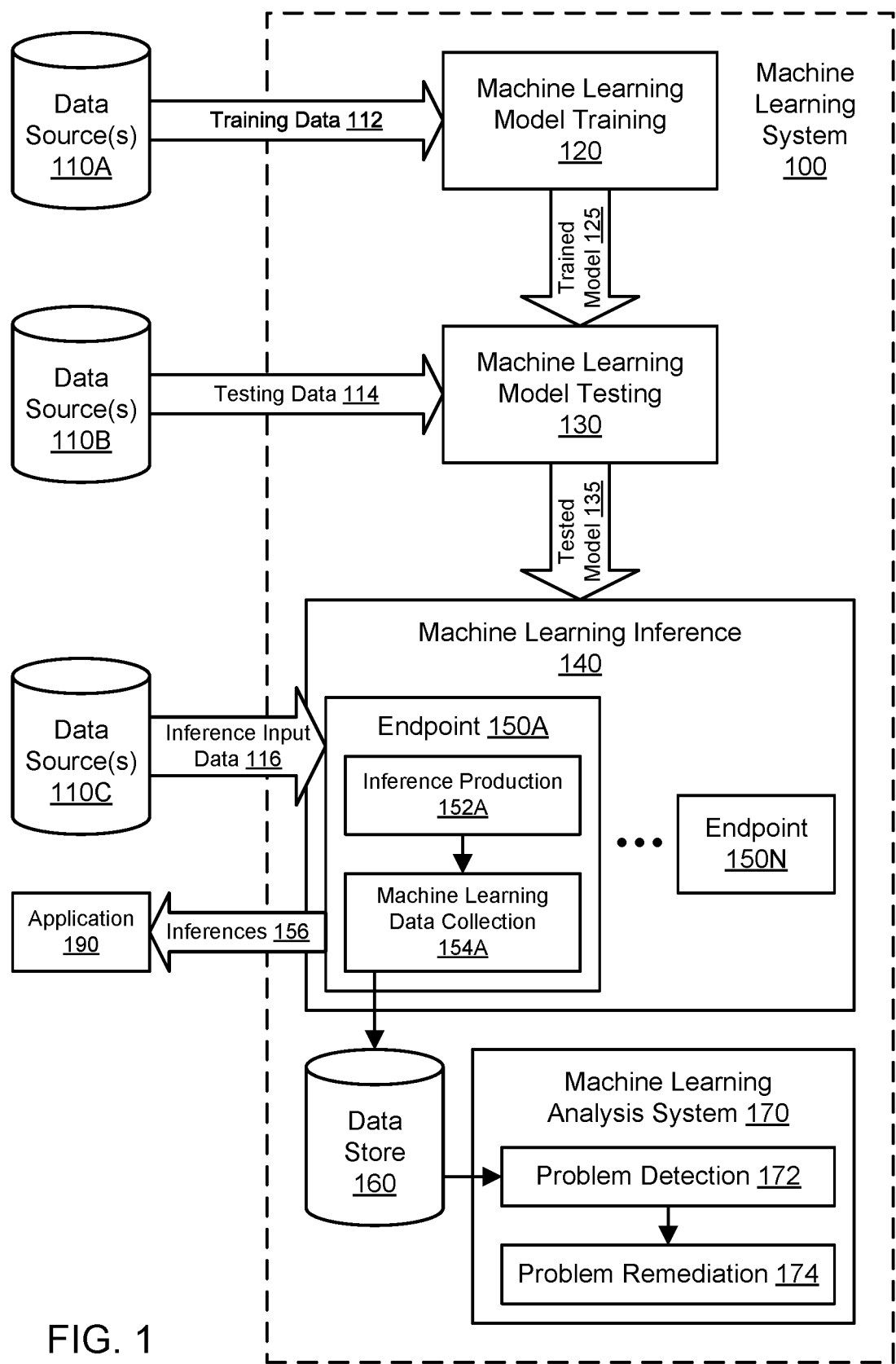
FIG. 1 illustrates an example system environment for automated problem detection for machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated problem detection for machine learning models are described. Machine learning models may be deployed in production environments and may produce inferences (predictions of behavior) based on input data. Using the techniques described herein, the use of machine learning models to produce inferences may be monitored to detect a variety of problems. Information regarding inputs, outputs, and other metadata for a set of inferences over a window of time may be collected and written to storage. The information may be retrieved from storage and analyzed after the fact either periodically (on a schedule) or on demand, with minimal impact to the inference performance, and with minimal input or effort by users. However, users may configure the analysis with user-specified sampling rates, user-specified analysis frequencies, and/or user-specified thresholds for problem detection. The analysis may automatically detect problems or anomalies such as models that fail golden examples, outliers in input data, inference data distribution changes, label distribution changes, label changes for individual entities, ground truth discrepancies, and/or other forms of data drift or model drift. The analysis system may automatically notify users of detected problems and/or provide users with sufficient information for the user to examine the inputs, outputs, and intermediate steps of particular inferences. The analysis system may automatically initiate retraining of machine learning models based on problem detection. Using the techniques described herein, the quality of machine learning models in production may be monitored automatically and efficiently.

Various embodiments of methods, systems, and computer-readable media for debugging and profiling of machine learning model training are described. Using training data and a training algorithm, machine learning models may be trained so that they can be used to produce inferences (predictions of behavior) based on real-world input data. Using the techniques described herein, the training of machine learning models may be monitored to detect a variety of problems or conditions. A cluster of computing devices may be used to train a particular model. During the training, data associated with the training may be collected and written to local storage for individual hosts in the cluster. The training process may be iterative with numerous phases or steps, and data may be collected for each of those phases or steps. The collected data may include data usable for debugging such as inputs, outputs, tensor data, and metadata (e.g., a container identifier, a timestamp, and so on) associated with training. The collected data may include data usable for performance profiling such as processor usage metrics, memory usage metrics, storage usage metrics, I/O metrics, network usage metrics, and so on. The collected data may be aggregated and analyzed, e.g., at a centralized component such as a machine learning analysis system. For debugging of the model training process, the analysis may use the collected debugging data for rule evaluation to detect conditions, problems, or anomalies with the training, e.g., vanishing/exploding gradients, data distribution differences across batches or computing devices in the cluster, and so on. For profiling of the model training process, the analysis may use the collected profiling data for rule evaluation to detect performance conditions or performance problems, e.g., bottlenecks in the training cluster. The analysis system may automatically generate alarms when particular conditions are detected or initiate actions to modify the training. The automated monitoring as described herein may lead to early detection of problems with model training, e.g., to detect a model that will not converge before too much time has elapsed. Based on the problem detection, the training process may be halted and use of the training cluster may be discontinued in order to conserve resources. The training process may be restarted after making changes to the training data or learning algorithm.

Various embodiments of methods, systems, and computer-readable media for GPU code injection to summarize machine learning training data are described. The training cluster used to generate a trained machine learning model may use a set of graphics processing units (GPUs) to perform aspects of the training. The training process may employ general-purpose GPU computing (GPGPU) techniques to take advantage of the parallelism offered by GPUs. During the training, data associated with the training may be collected and written to local storage for individual hosts in the cluster. The training process may be iterative with numerous phases or steps, and data may be collected for each of those phases or steps. The collected data may include data usable for debugging such as inputs, outputs, tensor data, and metadata (e.g., a container identifier, a timestamp, and so on) associated with training. For example, a full set of tensor data may be produced on a GPU and stored in the memory of that GPU during a training step. For sufficiently large tensors, the full tensor data for a step may represent millions of individual values. If the full tensor data is output by the GPU, saved to local storage at the corresponding host, and provided to a centralized analysis system over a network, then consumption of resources (e.g., storage and network resources) may be high. To reduce the quantity and size of tensor data used for analysis, reduction operators may be injected into GPUs dynamically to produce summarized or aggregated forms of the tensor data. For example, the reduction operators may produce the minimum value of a full set of tensor data, the maximum value of a full set of tensor data, the average value of a full set of tensor data, and so on. GPUs may also be used to perform operations on tensor data that are not necessarily reductive, such as comparisons of one tensor to another tensor. By performing a reduction on the GPU, a much smaller set of tensor data (e.g., a single value) may be output by the GPU instead of thousands or millions of individual values. By performing reductions and non-reductive operations on the GPU, operations on tensors may be performed more efficiently than if a CPU were used. Using the techniques described herein for GPU code injection, resource use may be minimized for local storage at the training cluster, remote storage at a repository of debugging data, local storage at an analysis system, CPU resources at the training cluster or analysis system (that might otherwise be used to perform the summarization), and network bandwidth between any of the described components.

As one skilled in the art will appreciate in light of this disclosure, embodiments may be capable of achieving certain technical advantages, including some or all of the following: (1) improving the quality of machine learning models in production by automatically detecting common problems and notifying users; (1) improving the quality of machine learning models in production by automatically retraining and redeploying models if problems are detected; (3) improving the performance of inference production with machine learning models by decoupling data collection during inference from data analysis; (4) improving the quality of machine learning models in training by automatically detecting common problems and notifying users; (5) reducing compute resource consumption by discontinuing a model training process after early detection of problems with the training; (6) reducing storage consumption by outputting summarized tensor data from a GPU instead of outputting the full tensor data; (7) reducing network bandwidth consumption by outputting summarized tensor data from a GPU instead of outputting the full tensor data; (8) reducing the latency of operations on tensors by using under-utilized GPUs rather than CPUs to perform the operations; and so on.

Automated Problem Detection for Machine Learning Models

FIG. 1 illustrates an example system environment for automated problem detection for machine learning models, according to some embodiments. A machine learning system 100 may manage the use of machine learning models on behalf of clients. A machine learning model may be associated with three stages or phases: a training phase where the model is trained, a testing phase where the model is tested, and an inference phase where the model is applied to live data to produce inferences (predictions). In various embodiments, the machine learning system 100 may perform machine learning model training tasks 120, machine learning model testing tasks 130, and machine learning inference tasks 140. The machine learning model training 120 may utilize training data 112 from one or more data sources 110A and may produce a trained model 125. The machine learning model testing 130 may test the trained model 125 using testing data 114 from one or more data sources 110B and may produce a tested model 135. The machine learning inference system 140 may apply the tested model 135 to inference input data 116 from one or more data sources 110A and may produce inferences 156.

For example, the inference system 140 may use a model 135 to determine the likelihood of particular users clicking on particular advertisements in a web browser or other internet-enabled interface. The input to such a model may represent unique user identifiers, user demographic information, ad click histories for individual users, and so on. The inferences produced by such a model 135 may represent probability values or labels. As another example, the inference system 140 may use a model 135 to determine whether to offer home loans to applicants. The input to such a model may represent unique user identifiers, user income data, user credit histories, and so on. The inferences produced by such a model 135 may represent scores indicative of the attractiveness of individual applicants for the loans.

In some embodiments, a machine learning model may be associated with a collection of weights trained against a corpus of data, which has "learned" how to apply those weights to classify or interpret a new sample of data. A trained model 125 may be created through an automated process (e.g., training 120) but may also be constructed by hand in a number of ways, such as by directly implementing code, by computing and manually entering parameterization, and so on. A machine learning model may be accompanied by a ruleset that interprets the model scores. A ruleset may consume a vector of features and produce a new vector (often a small one, e.g., containing only a single entry).

Data sources 110A, 110B, and 110C may include one or more database systems, data stores, tables, repositories, storage services, sources of streaming data, servers, memory locations, and so on. The training data 112 may be gathered by users or automated systems and used as input to an initial machine learning model to prepare the model to produce predictions. The training data 112 may be formatted according to a schema using a transformation task. Similarly, the testing data 114 may be gathered by users or automated systems and used as input to a trained machine learning model 125 to verify that the model produces correct inferences. The testing data 114 may also be formatted according to the schema using a transformation task. The inference input data 116 may represent real-world data, may be gathered by users or automated systems, and may be used as input to the tested machine learning model 135 to produce predictions about real-world behavior. The inference data 116 may be formatted according to the schema using a transformation task.

The training 120, testing 130, and inference 140 phases may be implemented in the same execution environment or in different execution environments. For example, in one embodiment, a unified machine learning framework may perform the training 120, testing 130, and inference 140 in a hosted environment on behalf of clients. In some embodiments, training 120 and/or testing tasks 130 may be performed by clients to produce a model, and that model may be used to produce inferences in a hosted environment on behalf of a client. In some embodiments, the training 120 and/or testing tasks 130 may be performed in a hosted environment on behalf of a client, and the inference tasks 140 may be performed in an external environment (e.g., using client-hosted servers or using another machine learning framework). Any of the training 120, testing 130, and inference 140 components may represent individual systems or subsystems that are loosely coupled or decoupled from one another.

The inference system 140 may include a plurality of endpoints such as endpoint 150A through endpoint 150N. Each of endpoints 150A-150N may host one or more machine learning models that are used to generate inferences. Each of endpoints 150A-150N may include one or more hosts or servers that perform inference tasks. The endpoints 150A-150N may be largely independent of one another such that the performance of one endpoint may not necessarily affect the operation of another endpoint. In one embodiment, an endpoint such as endpoint 150A may include a component for inference production 152A. The inference production 152A may apply a trained and tested machine learning model 135 to inference input data 116 in order to generate inferences 156. The inferences 156 may be produced in substantially real-time, e.g., with minimal delays after the gathering of the inference input data 116. The inferences 156 may be used by an application 190 to make decisions. For example, if the inferences 156 represent probability values or labels for the likelihood of particular users clicking on particular advertisements in a web browser, then the application 190 may represent a web server that generates particular advertisements for particular users. As another example, if the inferences 156 represent scores indicative of the attractiveness of individual applicants for loans, then the application 190 may represent a loan system that generates loan offers or approves applications for loans. The loan system may be automated or may rely on user input to approve the recommendations generated by the inference system 140 as inferences 156.

An endpoint 150A may also include a component for machine learning data collection 154A. The collected inference data may represent data associated with the use of a machine learning model to produce inferences. The data collection 154A may, for individual inference requests, collect inference data such as the inference input data, the resulting inference, and various elements of model metadata (e.g., a model identifier, a model version identifier, an endpoint identifier, a timestamp, a container identifier, and so on). The data collection 154A may, for individual inference requests, collect model data artifacts representing intermediate results before the final prediction is generated. The data collection 154A may not necessarily collect machine learning data for all inferences but may instead sample the inference production 152A. The sampling rate may represent a default rate or may be specified by a client associated with the machine learning model, e.g., using a monitoring configuration provided by the client. By sampling the inference data, the data collection 154A may reduce its impact on the latency of the inference production 152A. In some embodiments, clients may also enable or disable data collection 154A on a model-by-model or endpoint-by-endpoint basis.

The data collection 154A may store the collected inference data using a data store 160. The data store 160 (including the particular storage location, bucket, or account within the data store) and other data collection parameter values may be identified by a user associated with the model 135, e.g., when submitting a request to create the endpoint 150A. In one embodiment, for example, an endpoint creation request may be formatted as shown in the following example, with the user selecting to capture the inputs and outputs of the container with the model as well as custom data to be captured from within the container:

```
CreateEndpoint request
{
    "EndpointConfigName": "string",
    "EndpointName": "string",
    "DataCaptureConfigs": [{
        "VersionName": "string",
        "SamplingPercentage": number,
        "DestinationAddress": "pathname"
        "CaptureFormat": "SIMPLIFIED_CSV" | "MERGED_JSON"
    "CaptureOptions" : [{
        "CaptureIndexName": "string",
        "CaptureType": "INPUT" | "OUTPUT" | "CUSTOM",
        "CaptureBoundary": "ENDPOINT" | "CONTAINER",
        "CaptureContainerHostname" : "string"
        }]
    }]
}
```

The data store 160 may be external to the endpoint 150A. For example, the data store 160 may represent a storage service of a provider network, and the inference data may be written to a particular storage location (or set of locations) owned by the client associated with the model 135. By decoupling the data store 160 from the endpoint 150A, the data collection 154A may further reduce its impact on the latency of the inference production 152A. The endpoint 150A may batch the inference data and write it to the data store 160 periodically. The inference data may be collected for particular windows of time (e.g., for one-hour or twenty-four-hour periods) such that the inference data for one window of time is collected in one chunk of data in the data store 160 while the inference data for another window of time is collected in another chunk of data in the data store 160.

A machine learning analysis system 170 may use the collected inference data in the data store 160 to perform automated analysis of inference production 152A. The analysis system 170 may determine the correctness of inputs, outputs, and intermediate steps of the inference production and/or the quality of deployed machine learning models. The analysis system 170 may include a component for automated problem detection 172 that attempts to find one or more types of problems, anomalies, or other flaws in a model or its input data. As will be discussed in greater detail with respect to FIG. 6 through FIG. 11, the analysis may automatically detect problems or anomalies such as models that fail golden examples, outliers in input data, inference data distribution changes, label distribution changes, label changes for individual entities, ground truth discrepancies, and/or other forms of data drift or model drift. In some embodiments, the analysis may utilize training data 112 and/or testing data 114. The analysis may be performed according to thresholds, and thresholds may be specified by a client associated with the machine learning model, e.g., using an analysis configuration provided by the client in a user interface or programmatic interface.

In one embodiment, the analysis 170 may produce a predefined set of metrics for a data set within the analysis window. The metrics may include statistics such as min, max, standard deviation, mean, median, histograms, and quantiles. The metrics may be calculated and made accessible to a client, e.g., in a storage location accessible to the client. A client may configure which features of the input data are used for metrics and/or how many items in a batch are used for computation of metrics. For example, the metrics may be represented in a data structure according to the following example:

```
{
    # dataset-level stats
    "dataset": {
        "item_count": number
    },
    # feature-level stats
    "features": [
        {
            "name": "feature-name",
            "type": "Integral" | "Fractional" | "String",
            "num_stats": { # for integers and fractions
                "common": {
                    "num_non_missing": number,
                    "num_missing": number
                }
                "mean": number,
                "std_dev": number,
                "num_zeros": number,
                "median": number,
                "max": number,
                "histogram": {
                    "type": "regular" | "quantile"
                    "buckets": [{"low_value": number,
                        "high_value": number,
                        "sample_count": number}]
                }
            }
            "string_stats": { # for string types
                "common": {
                    "num_non_missing": number,
```

```
        "num_missing": number
    }
    "unique_count": number,
    "avg_length": number,
    "histogram": {
        "type": "regular" | "quantile"
        "buckets":
            [{"value": "string",
              "sample_count": number}]
        }
      }
    }
  ]
}
```

In various embodiments, the analysis system 170 may be hosted in the same execution environment as the inference system 140 or in a different execution environment than the inference system. For example, the analysis 170 may be part of the same provider network or machine learning framework as the inference 140. As another example, the analysis 170 may be hosted in a cloud computing environment, and the inference system 140 may be hosted remotely on client premises (or in a different machine learning framework) and may be configured to perform the data collection 154A and write the inference data in an expected format to the data store 160 (or otherwise provide the data to the analysis system).

The analysis 170 may be performed regularly and periodically according to an analysis rate (e.g., every twenty-four hours). The analysis rate may represent a default rate or may be specified by a client associated with the machine learning model, e.g., using the analysis configuration provided by the client. The analysis 170 of inference data may be initiated on a schedule, e.g., every twenty-four hours to analyze the previous day's worth of inference data. The analysis 170 may be initiated on a manual and ad-hoc basis, e.g., by user input from a client seeking to diagnose problems with a machine learning model. In some embodiments, clients may also enable or disable problem detection 172 on a model-by-model or endpoint-by-endpoint basis to reduce the performance impact and/or expense of unwanted analysis. By decoupling the analysis system 170 from the inference system 140, the machine learning system 100 may reduce the performance impact of the problem detection 172 on the inference production 152A.

The analysis system 170 may include a component for automated problem remediation 174 that attempts to remediate, correct, or otherwise improve a detected problem. The problem remediation 172 may initiate one or more actions to improve a model or its use in generating inferences, e.g., such that the inferences produced by the improved model (or the same model using an improved input data set) represent a higher degree of accuracy and/or usefulness for the application 190. In one embodiment, the analysis system 170 may automatically notify users of detected problems and/or provide users with sufficient information for the user to examine the inputs, outputs, and intermediate steps of particular inferences. In one embodiment, the analysis system 170 may automatically initiate retraining of machine learning models based on problem detection.

Figure 21:
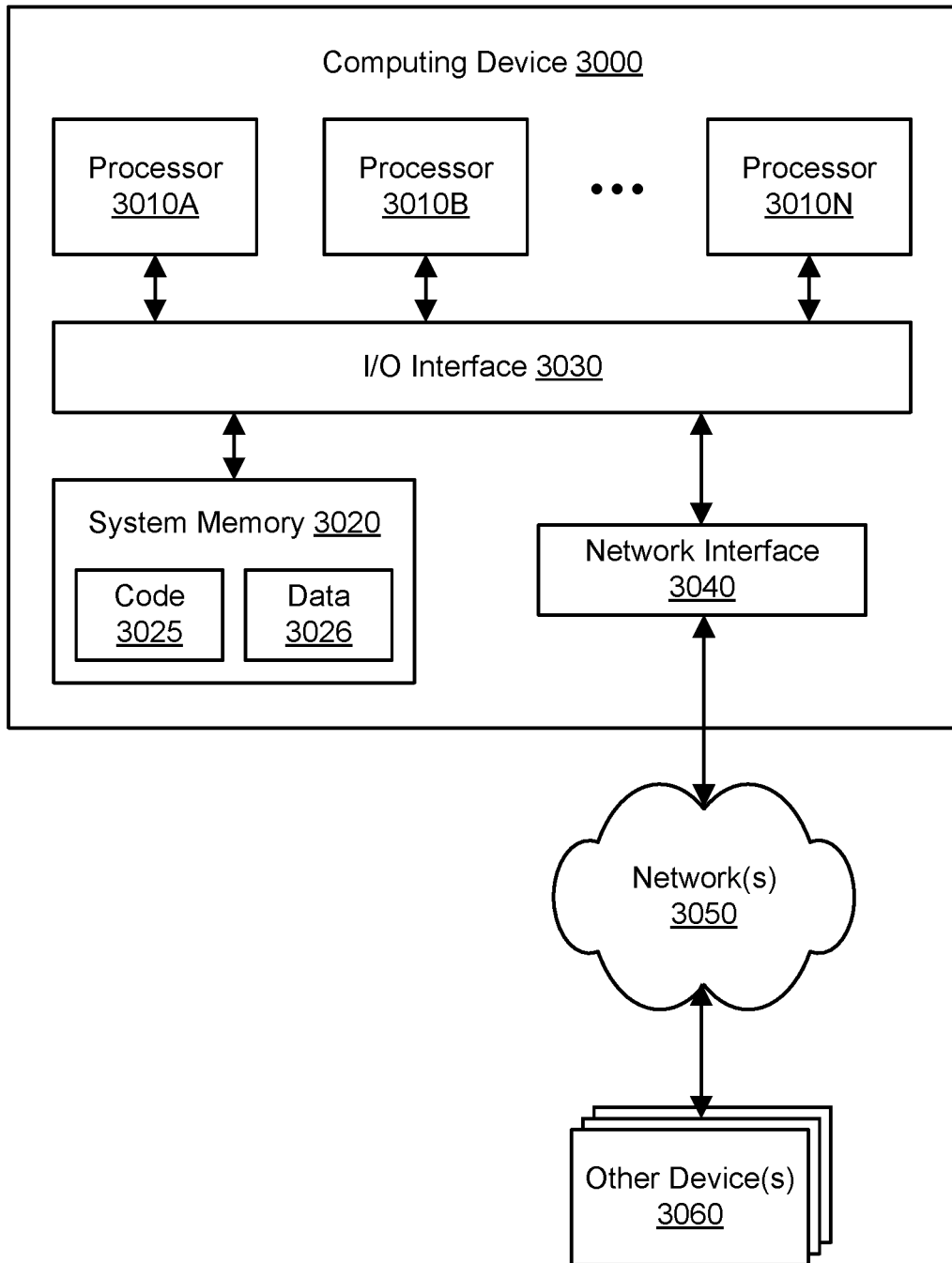
FIG. 21 illustrates an example computing device that may be used in some embodiments.

In some embodiments, a machine learning model may be encapsulated in a container for execution in a containerized environment. The program code of the container need not be modified in order to perform the data collection 154A, problem detection 172, or problem remediation 174. An execution environment may include or be associated with one or more systems, services, or other components that implement machine learning tasks. Any of the systems, services, or other components of an execution environment may be built on one or more computing devices such as the example computing device 3000 as illustrated in FIG. 21. The execution environments may vary in terms of their underlying configurations. In one embodiment, the execution environments may include MapReduce-based cluster computing environments, stream processing systems, workflow systems such as Amazon Simple Workflow Service, and other suitable environments. In one embodiment, an execution environment may be implemented using a cluster of computing devices that cooperate to execute machine learning tasks. A cluster may be provisioned, launched, or otherwise spun up in order to perform one or more machine learning tasks. In one embodiment, a particular execution environment may use an orchestration framework such as Apache Hadoop, Apache Spark, and so on to manage a cluster.

The machine learning system 100 may be implemented using any suitable number and configuration of computing devices, any of which may be implemented by the example computing device 3000 illustrated in FIG. 21. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more of the training 120, testing 130, inference 140, and/or analysis systems 170 may be implemented in a service-oriented system in which multiple services (e.g., services in one or more hosted execution environments) collaborate according to a service-oriented architecture. In such an environment, one or more of the training 120, testing 130, inference 140, and/or analysis services 170 may offer their functionality as a service to multiple clients. To enable clients to invoke their functionality, the training 120, testing 130, inference 140, and/or analysis services 170 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of a machine learning task may be offered to clients in exchange for fees, or the cost associated with performing a machine learning task may be assessed to a responsible entity.

Components of the system 100 may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2:
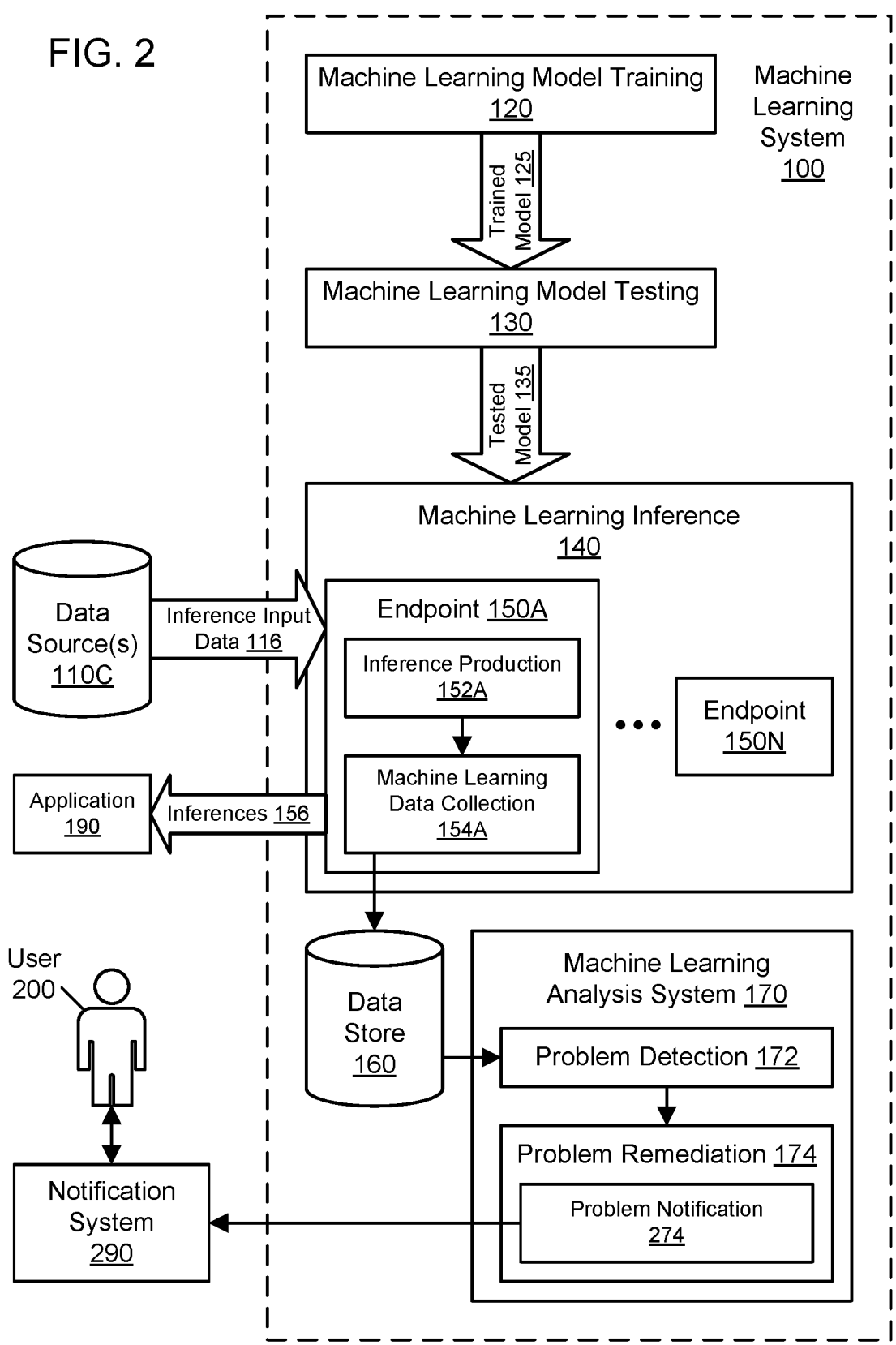
FIG. 2 illustrates further aspects of the example system environment for automated problem detection for machine learning models, including the generation of notifications describing problems detected in machine learning models, according to some embodiments.

FIG. 2 illustrates further aspects of the example system environment for automated problem detection for machine learning models, including the generation of notifications describing problems detected in machine learning models, according to some embodiments. As discussed above, the analysis system 170 may include a component for automated problem remediation 174 that attempts to remediate, correct, or otherwise improve a detected problem. As shown in FIG. 2, the problem remediation 174 may include a component for problem notification 274. The problem notification component 274 may generate notifications or alerts that describe detected problems with machine learning models or inference data. A notification may indicate, for example, the type of problem, the date or window of time in which the problem was encountered, a model identifier, a model version number, an endpoint identifier, a container identifier, information specific to the inferences for which the problem was detected, and other information useful to identify and remediate a machine learning problem. The problem notification component 274 may provide users with sufficient information for the user to examine the inputs, outputs, and intermediate steps of particular inferences. In one embodiment, the problem notification component 274 may send notifications to a notification system 290 to which a relevant user 200 has access. The notification system 290 may represent a service in a cloud computing environment or other provider network that collects notifications and metrics from multiple services used by a user account and funnels them to that user account. The notification system 290 may, for example, page or e-mail a user associated with the model when the problem notification is generated.

In some embodiments, the analysis 170 may be performed according to thresholds and/or tiers of thresholds. For example, if a model is less accurate by a threshold percentage yesterday than the day before yesterday, then a problem may be detected and a notification generated accordingly. Tiers of thresholds may represent severity levels of detected problems, and notifications may vary based (at least in part) on the tier in which a problem is placed. For example, a green tier may indicate that the model is working as expected, a yellow tier may indicate that one or more problems should be investigated, and a red tier may indicate that a model is probably broken and producing faulty inferences. The thresholds and/or tiers may be specified by users or may represent defaults. In some embodiments, the analysis 170 may generate metric dashboards that track individual results over time (e.g., the percentage of inferences that resulted in a particular classification) and/or the aggregate analysis (e.g., the accuracy of all inferences in comparison to ground truth values). The thresholds and tiers may be reflected in the problem notifications. Examples of thresholds are discussed below with respect to FIG. 6 through FIG. 11.

Figure 3:
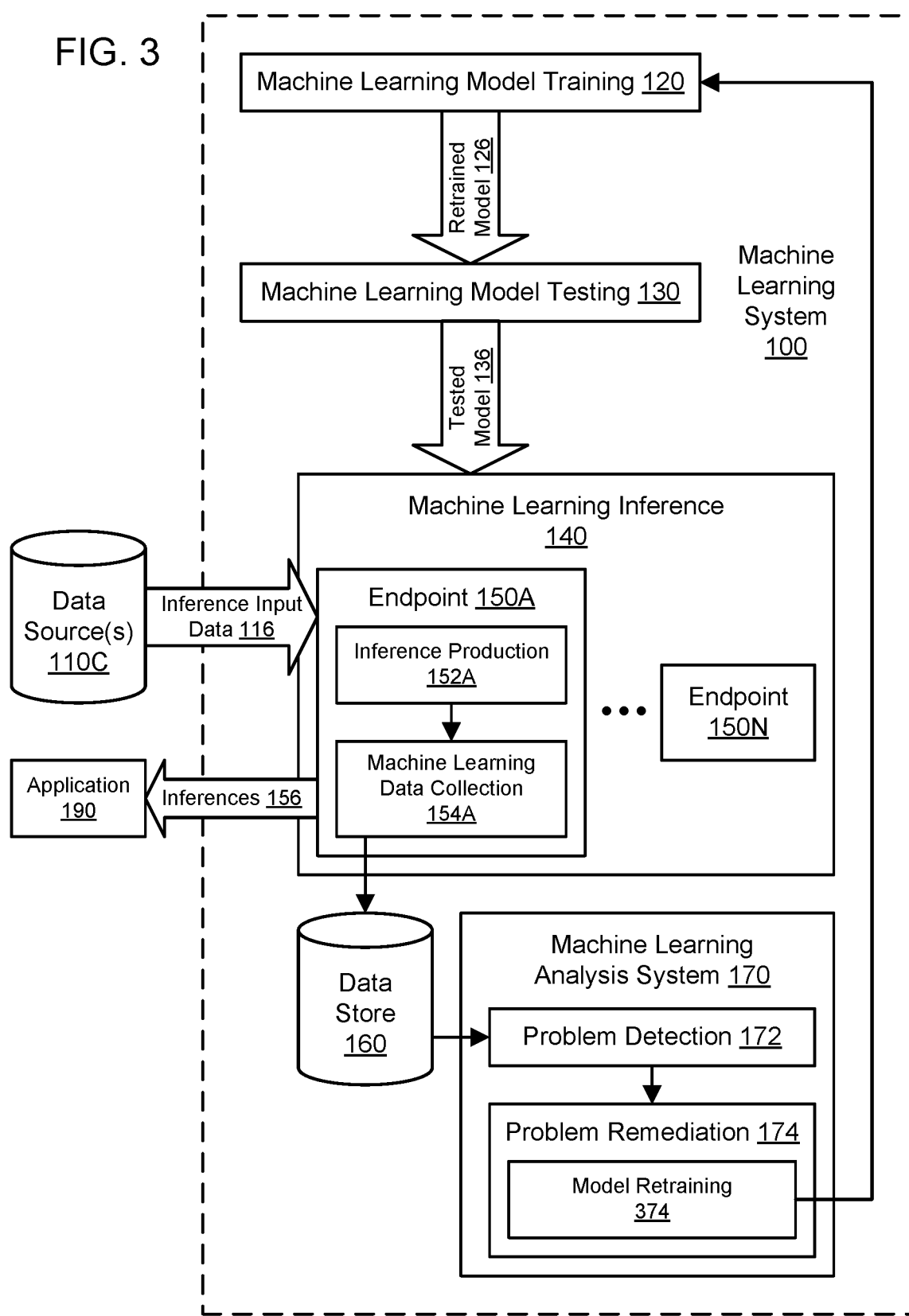
FIG. 3 illustrates further aspects of the example system environment for automated problem detection for machine learning models, including the automated retraining of machine learning models for which problems were detected, according to some embodiments.

FIG. 3 illustrates further aspects of the example system environment for automated problem detection for machine learning models, including the automated retraining of machine learning models for which problems were detected, according to some embodiments. As discussed above, the analysis system 170 may include a component for automated problem remediation 174 that attempts to remediate, correct, or otherwise improve a detected problem. As shown in FIG. 3, the problem remediation 174 may include a component for model retraining 374. In one embodiment, the analysis system 170 may automatically initiate retraining of machine learning models based on problem detection. In one embodiment, the retraining 374 may include generating a new set of training data. The new set of training data may be consistent with one or more characteristics of the inference input data 116. For example, if a particular post code was seen for 85% of people during training but only 5% of people during inference, then new training data may be collected or generated that reflects the 5% occurrence of the post code in inference data 116. The retrained model 126 may be automatically tested to produce a tested model 136 that may again be used to produce inferences using the inference system 140. The model may be periodically retrained using the automated analysis 170 so that the machine learning system 100 adapts to changes in input data, service dependencies, and so on.

Figure 4:
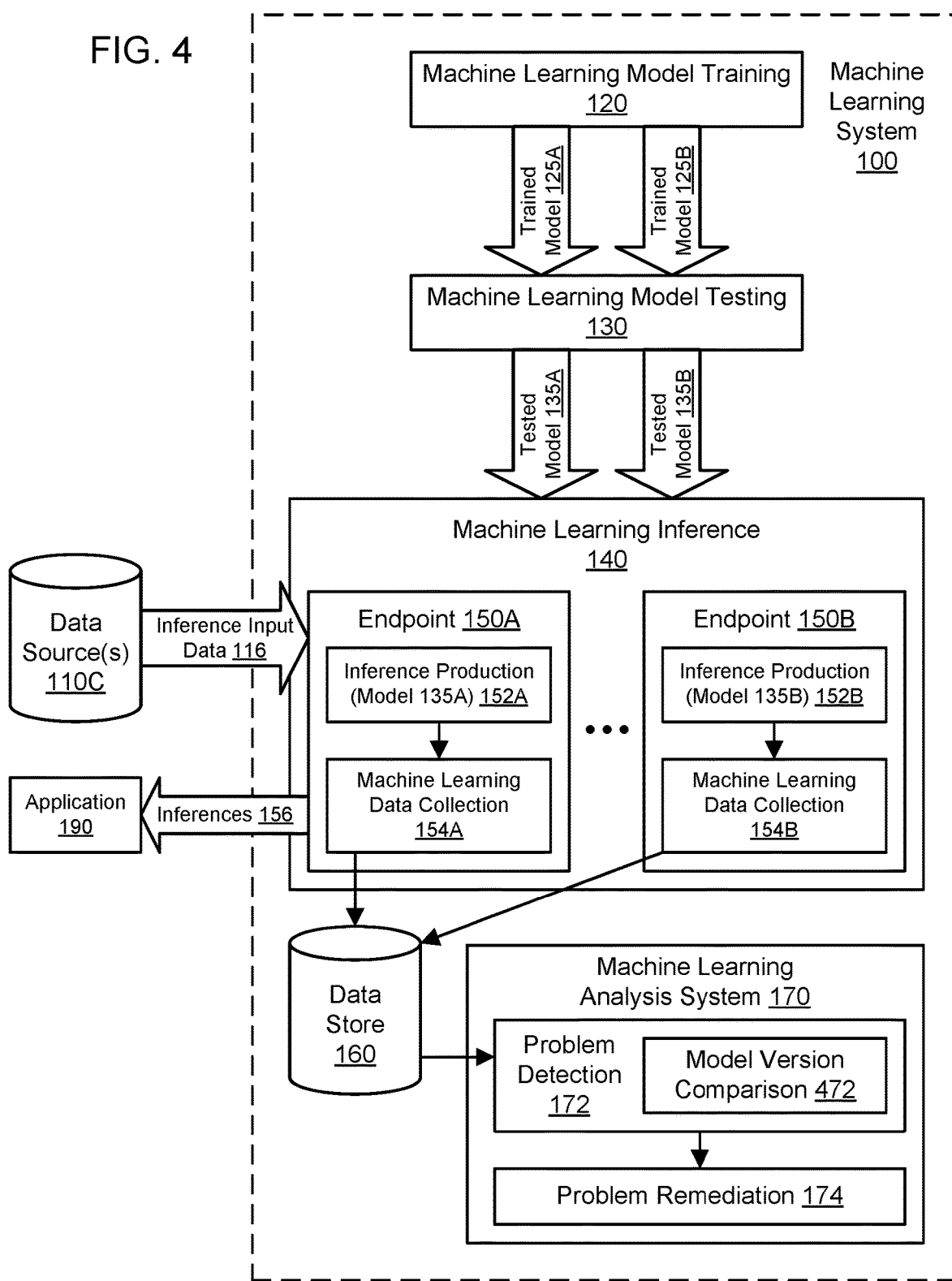
FIG. 4 illustrates further aspects of the example system environment for automated problem detection for machine learning models, including the analysis of different versions of a machine learning model, according to some embodiments.

FIG. 4 illustrates further aspects of the example system environment for automated problem detection for machine learning models, including the analysis of different versions of a machine learning model, according to some embodiments. In some embodiments, two different versions of a model may be trained, tested, and used to produce inferences in parallel or serially. For example, one version of a model may be represented using trained model 125A and tested model 135A, and another version of the model may be represented using trained model 125B and tested model 135B. One of the versions may represent a more recent version that is sought to be compared against an older version, or the two versions may represent alternatives whose performance is sought to be compared concurrently. The two versions may be deployed to one or more endpoints such as endpoint 150A and 150B. For example, the model 135A may be used for inference production 152A and data collection 154A at one endpoint 150A, and the model 135B may be used concurrently for inference production 152B and data collection 154B at another endpoint 150B. The two versions may be used to produce inferences 156 during the same window of time or during different windows of time. In one embodiment, both models may be applied to the same set of inference input data 116, e.g., when two alternative versions are tested in parallel. The collected inference data may be stored in the data store 160 and used by the analysis system 170 to perform a comparison 472 of the two model versions. The comparison 472 may generate metrics regarding accuracy of predictions, statistics regarding labels associated with the predictions, and other data usable to compare the quality of one model version against the quality of another model version.

In one embodiment, the analysis 170 may automatically detect problems or anomalies with machine learning models that are frequently retrained. The analysis 170 may compare two versions of a model to checkpoint previous versions and provide improved alerts. For frequently retrained models, the analysis 170 may detect anomalous model drift. For example, if the difference between the prediction distributions of the current model and the previous model is typically 0.05 in squared distance, but for the current model the difference is 1.5, the analysis 170 may report that the training data may be contaminated or otherwise problematic. For frequently retrained models, the analysis 170 may assist in determining an appropriate training frequency. The analysis 170 may plot the accuracy over time; if the accuracy is a straight line, then the analysis may recommend that training be performed less frequently to conserve resources. However, if the line is jagged, then the analysis 170 may recommend that training be performed more frequently to improve the quality of predictions. In some embodiments, the analysis 170 may alert a user or automatically initiate model retraining once the predictions differ between the current model and the previous model.

Figure 5:
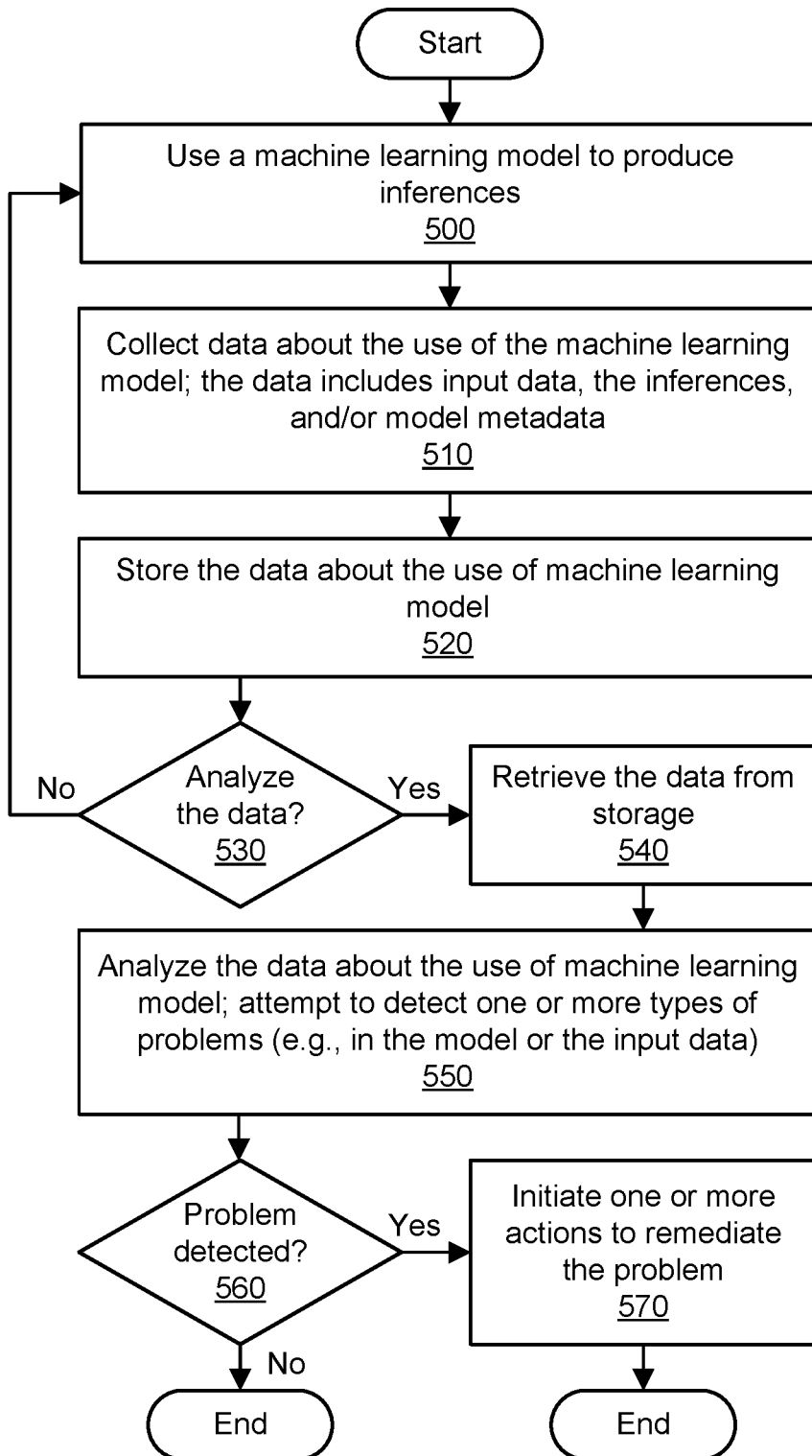
FIG. 5 is a flowchart illustrating a method for automated problem detection for machine learning models, according to some embodiments.

FIG. 5 is a flowchart illustrating a method for automated problem detection for machine learning models, according to some embodiments. As shown in 500, inferences (predictions) may be generated using a machine learning model and based (at least in part) on inference input data. The inference generation may apply a trained and tested machine learning model to the inference input data in order to generate inferences. The inferences may be produced in substantially real-time, e.g., with minimal delays after the gathering of the inference input data. The inference production may be hosted at an endpoint in a cloud computing environment, on a client-hosted server, or in another machine learning framework. The inferences may be used by an application to make decisions, potentially in near real-time. For example, if the inferences represent probability values or labels for the likelihood of particular users clicking on particular advertisements in a web browser, then the application may represent a web server that generates particular advertisements for particular users.

As shown in 510, data may be collected that is associated with the use of the machine learning model. The collected inference data may represent data associated with the use of the machine learning model to produce inferences over some window of time (e.g., a twenty-four hour period). The data collection may, for individual inference requests, collect inference data such as the inference input data, the resulting inference output, and/or various elements of model metadata (e.g., a model identifier, model version identifier, endpoint identifier, a timestamp, a container identifier, and so on). The data collection may, for individual inference requests, collect model data artifacts representing intermediate results before the final prediction is generated. The data collection may not necessarily collect machine learning data for all inferences but may instead sample the inference production.

As shown in 520, the collected data may be stored, e.g., in a data store or other storage location. The data store may represent a storage service of a provider network, and the inference data may be written to a particular storage location (or set of locations) owned by the client associated with the model. By decoupling the data store from the endpoint or server that hosts the inference production, the data collection may further reduce its performance impact on the inferences. The endpoint or server may batch the inference data and write it to the data store periodically. The inference data may be collected for particular windows of time (e.g., for one-hour or twenty-four-hour periods) such that the inference data for one window of time is collected in one chunk of data in the data store while the inference data for another window of time is collected in another chunk of data in the data store.

As shown in 530, the method may determine whether to perform analysis of the stored data at the current time. For example, the analysis of inference data may be initiated on a schedule, e.g., every twenty-four hours to analyze the previous day's worth of inference data. As another example, the analysis may be initiated on a manual and ad-hoc basis, e.g., by user input from a client seeking to diagnose problems with a machine learning model. In some embodiments, clients may also enable or disable problem detection on a model-by-model or endpoint-by-endpoint basis to reduce the performance impact and/or expense of unwanted analysis. If analysis is not desired at this time, then the method may return to the operation shown in 500. Note that the inference generation shown in 500 may be performed continuously or regularly without being impacted negatively by the data collection or analysis of the collected data. As shown in 540, if analysis is desired at this time, then the data may be retrieved from storage. The inference production may be decoupled from the storage and from the analysis in order to minimize the performance impact on the inferences.

As shown in 550, the data may be analyzed in an attempt to detect one or more types of problems, e.g., with the model or the input data to the model. As will be discussed in greater detail with respect to FIG. 6 through FIG. 11, the analysis may automatically detect problems or anomalies such as models that fail golden examples, outliers in input data, inference data distribution changes, label distribution changes, label changes for individual entities, ground truth discrepancies, and/or other forms of data drift or model drift. As shown in 560, the method may determine whether a problem was detected. The analysis may be performed according to thresholds that determine whether a given observation about the model rises to the level of a problem that may require intervention. As shown in 570, if a problem was detected, then one or more actions may be initiated by the analysis system to remediate the problem. The problem remediation may initiate one or more actions to improve a model or its use in generating inferences. In one embodiment, the analysis may result in automatically notifying users of detected problems and/or provide users with sufficient information for the user to examine the inputs, outputs, and intermediate steps of particular inferences. In one embodiment, the analysis may result in automatically initiating retraining of machine learning models based on the problem detection.

Figure 6:
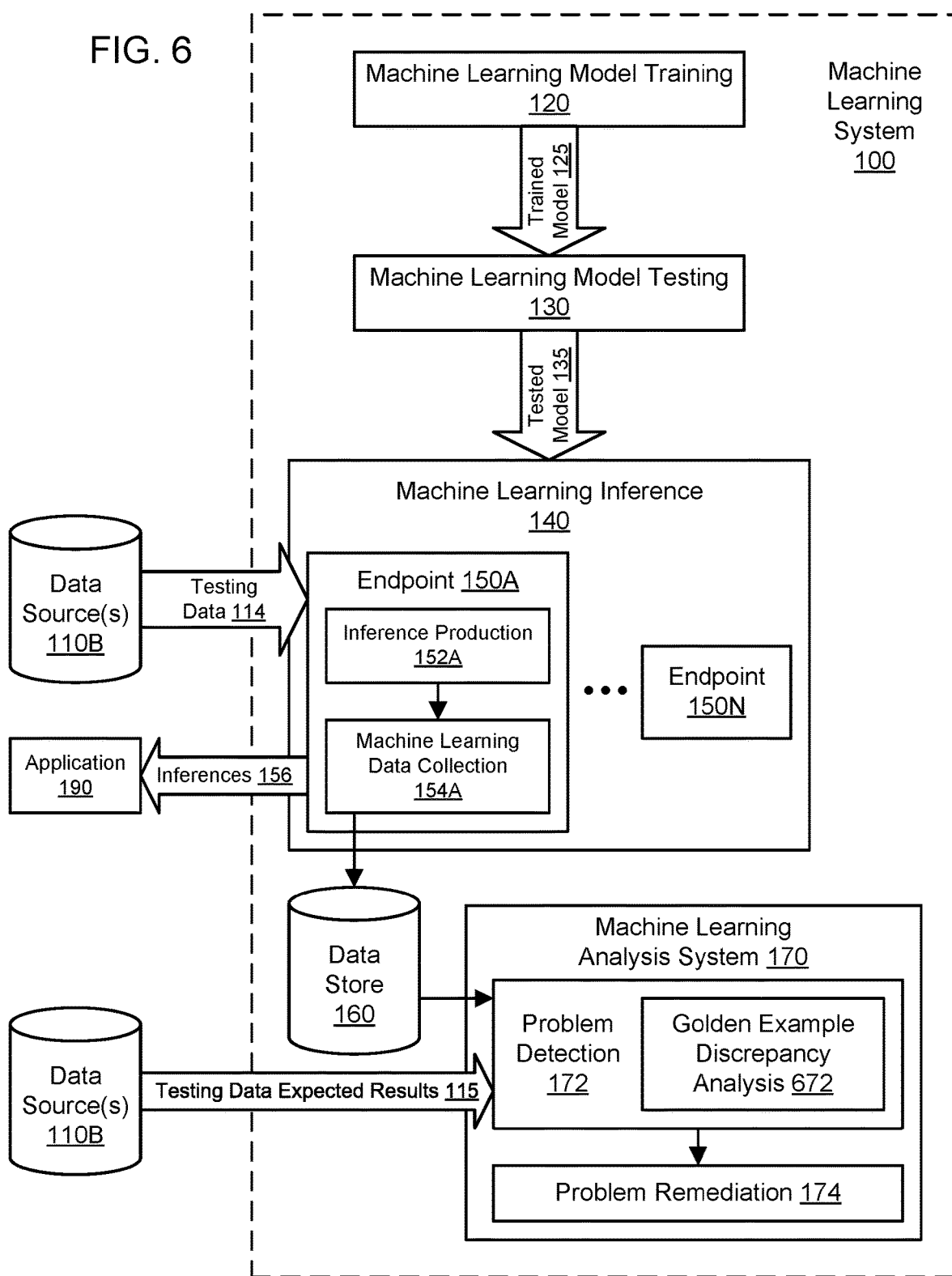
FIG. 6 illustrates further aspects of the example system environment for automated problem detection for machine learning models, including golden example discrepancy analysis for a machine learning model, according to some embodiments.

FIG. 6 illustrates further aspects of the example system environment for automated problem detection for machine learning models, including golden example discrepancy analysis for a machine learning model, according to some embodiments. In one embodiment, the analysis 172 may automatically detect problems or anomalies such as models that fail verified or "golden" examples. Golden example discrepancy analysis 672 may use a repository of testing data 114 associated with one or more golden examples. The testing data 114 may be regularly executed in batch or against the endpoint to check that the model 135 continues to work as expected with the testing data 114, e.g., by comparing results of the inference production 152A to expected results 115 of the testing data. By monitoring the quality of the model using golden examples, the golden example discrepancy analysis 672 may detect inadvertent deployment of a faulty model, detect changes in the production environment (e.g., changes in a dependency that have impacted the model), and/or ensure that new versions of a model do not break fundamental use cases.

Figure 7:
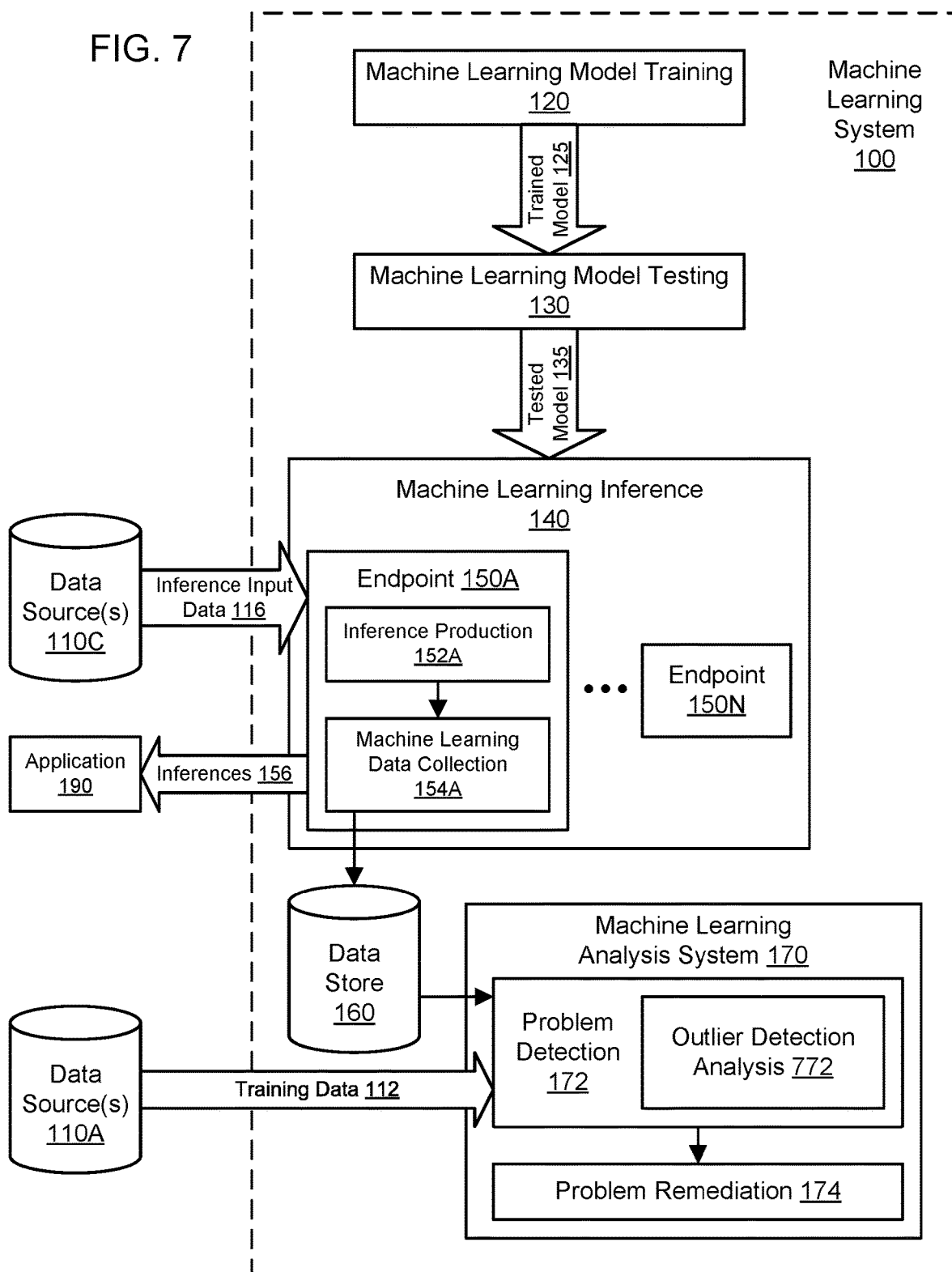
FIG. 7 illustrates further aspects of the example system environment for automated problem detection for machine learning models, including outlier detection analysis for a machine learning model, according to some embodiments.

FIG. 7 illustrates further aspects of the example system environment for automated problem detection for machine learning models, including outlier detection analysis for a machine learning model, according to some embodiments. In one embodiment, the analysis 172 may automatically detect problems or anomalies such as outliers in input data. Outlier detection analysis 772 may be applied to individual inference requests. To detect outliers in input data, the analysis 772 may capture statistics and other information about training data 112 and use such information to determine if a model 135 should be retrained or is otherwise faulty. The outlier detection analysis 772 may detect out-of-vocabulary examples in input data 116 for categorical or text values. The outlier detection analysis 772 may detect values outside ranges seen at training time. For example, the outlier detection analysis 772 may detect that a BANK_BALANCE input feature was less than 1,000,000 at training time, but an inference input value is 1,000,000,000. The outlier detection analysis 772 may detect sparse values in the input data 116 that were not sparse in the training data 112. For example, the outlier detection analysis 772 may detect that a column was missing in the inference data (and coerced to zero or a default value) 116 but was always present in the training data 112.

Figure 8:
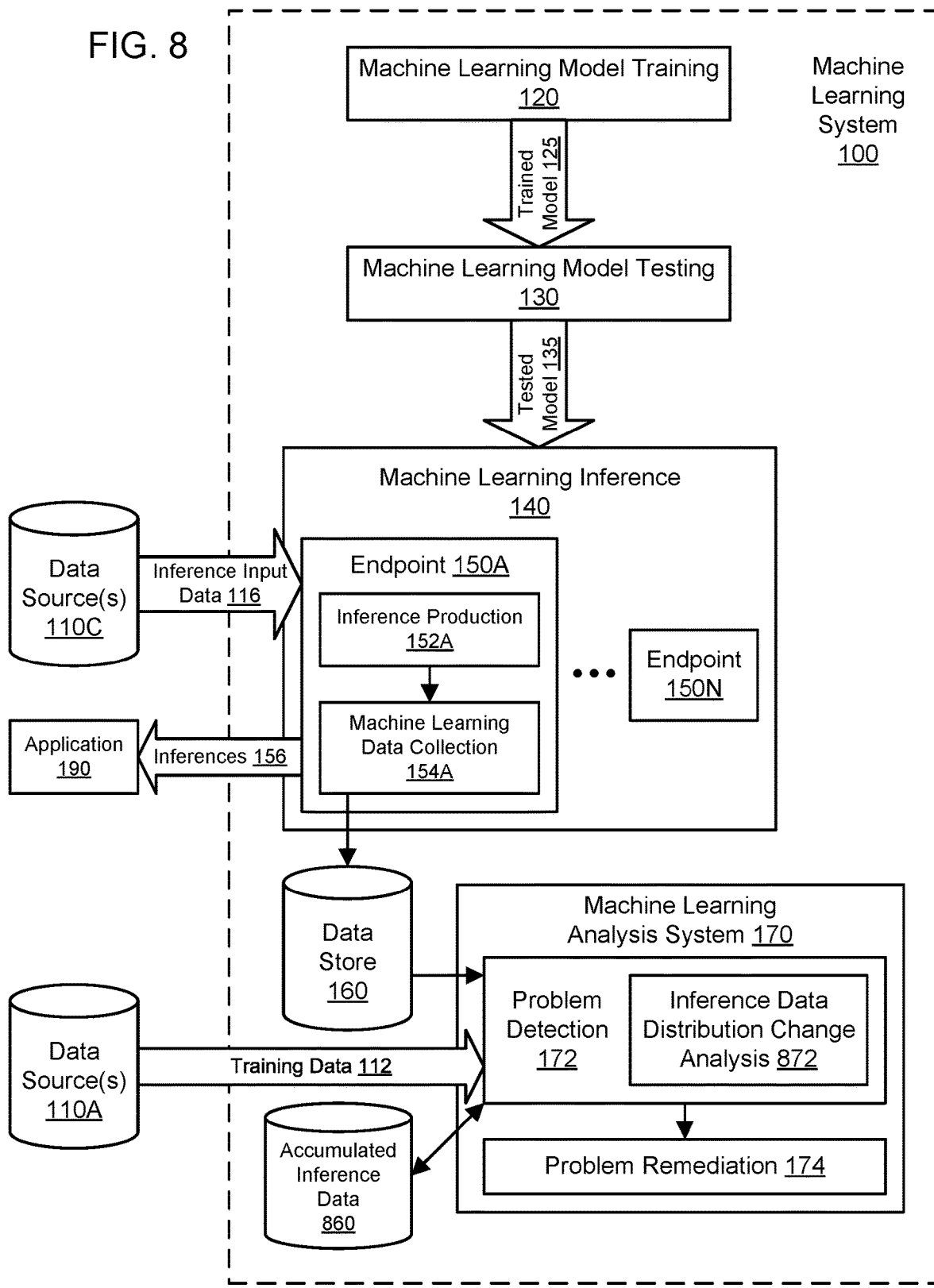
FIG. 8 illustrates further aspects of the example system environment for automated problem detection for machine learning models, including inference data distribution change analysis for a machine learning model, according to some embodiments.

FIG. 8 illustrates further aspects of the example system environment for automated problem detection for machine learning models, including inference data distribution change analysis for a machine learning model, according to some embodiments. In one embodiment, the analysis 172 may automatically detect problems or anomalies such as inference data distribution changes. Inference data distribution change analysis 872 may be applied to a collection of inference requests. To detect changes in input data distribution, the analysis 872 may collect inference payloads (e.g., the example data) and accumulate it in a data store 860. The inference payload data 860 may be subjected to inference data distribution change analysis 872 once a statistically significant amount of samples is collected or according to a schedule, e.g., every twenty-four hours. The inference data distribution change analysis 872 may calculate summary statistics for the accumulated data 860 and compare the statistics to corresponding statistics for training data 112. The inference data distribution change analysis 872 may compare the maximum, minimum, average, p90, and/or p10 values for continuous statistics. The inference data distribution change analysis 872 may compare the distribution of values for each category for categoricals. For example, a particular post code may have been seen for 85% of people during training but only 5% of people during inference. The inference data distribution change analysis 872 may compare the sparsity of values.

Figure 9:
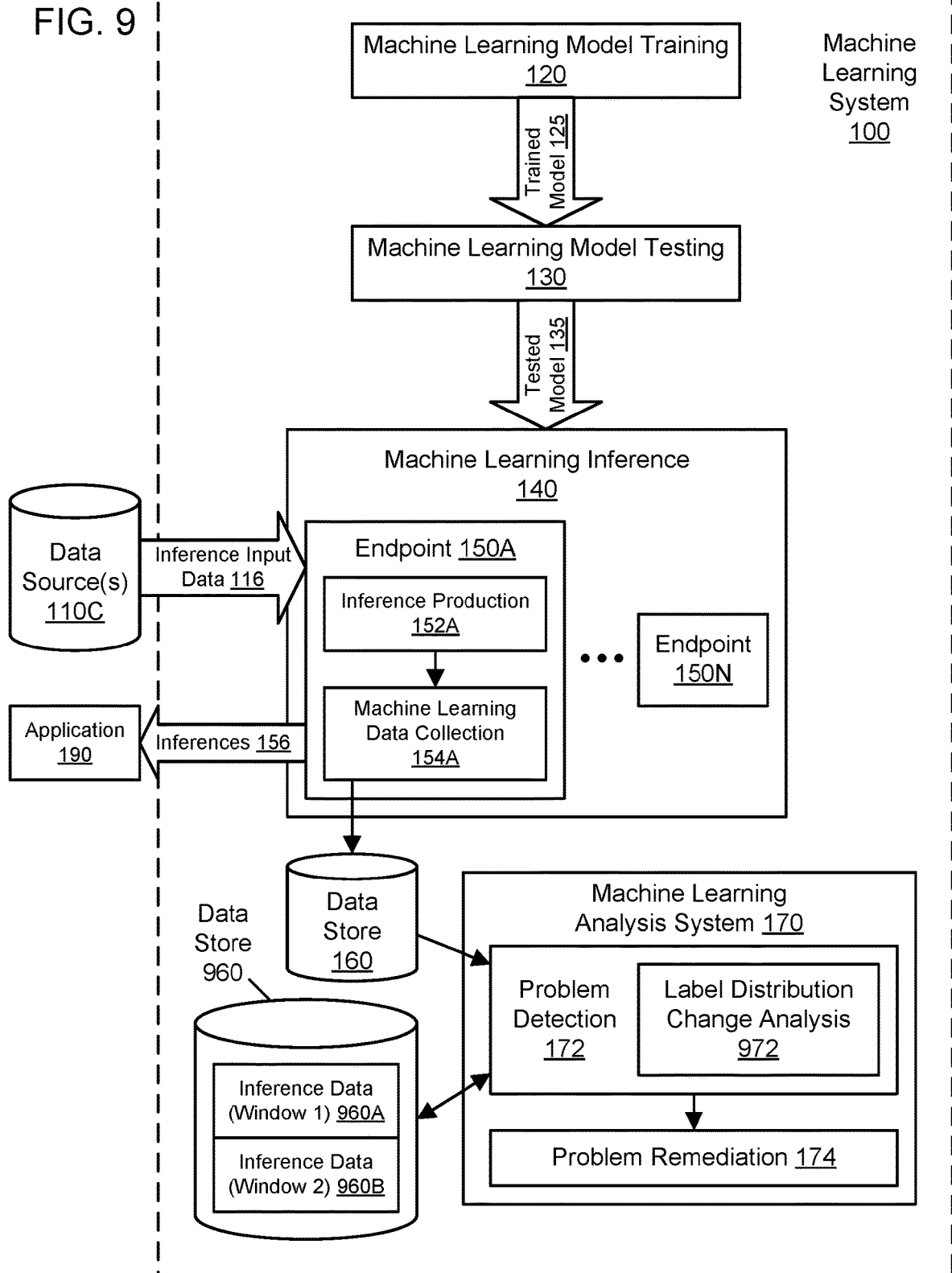
FIG. 9 illustrates further aspects of the example system environment for automated problem detection for machine learning models, including label distribution change analysis for a machine learning model, according to some embodiments.

FIG. 9 illustrates further aspects of the example system environment for automated problem detection for machine learning models, including label distribution change analysis for a machine learning model, according to some embodiments. In one embodiment, the analysis 172 may automatically detect problems or anomalies such as label distribution changes. Labels may represent categories of inferences, such as inferences labeled as TRUE or inferences labeled as FALSE. Label distribution change analysis 972 may be applied to a collection of inference requests. To detect changes in label distribution, the analysis 972 may collect inference payloads and corresponding responses (e.g., the predictions output by the model) and accumulate the data in a data store 960. The accumulated data 960 may be subjected to label distribution change analysis 972 for chunks of data associated with particular windows of time and according to a schedule, e.g., every twenty-four hours. The label distribution change analysis 972 may compare inference data 960B from a recent window of time (e.g., the previous twenty-four hours) with inference data 960A from a prior window of time (e.g., the preceding twenty-four-hour period). The label distribution change analysis 972 may determine whether the predictions are staying the same or similar over time. For classification, the label distribution change analysis 972 may compare the distribution in each class. For example, if yesterday had 85% TRUE predictions but the day before yesterday had 15% TRUE predictions, then the label distribution change analysis 972 may identify this discrepancy as a problem. For regression, the label distribution change analysis 972 may compare the distribution. For example, if yesterday the model predicted an INCOME of $100,000, but the day before yesterday the model predicted an INCOME of $50,000, then the label distribution change analysis 972 may identify this discrepancy as a problem with the model 135 or with the input data 116. In some embodiments, the label distribution change analysis 972 may be used to compare the predictions from one time period with a test set 114 or training set 112.

Figure 10:
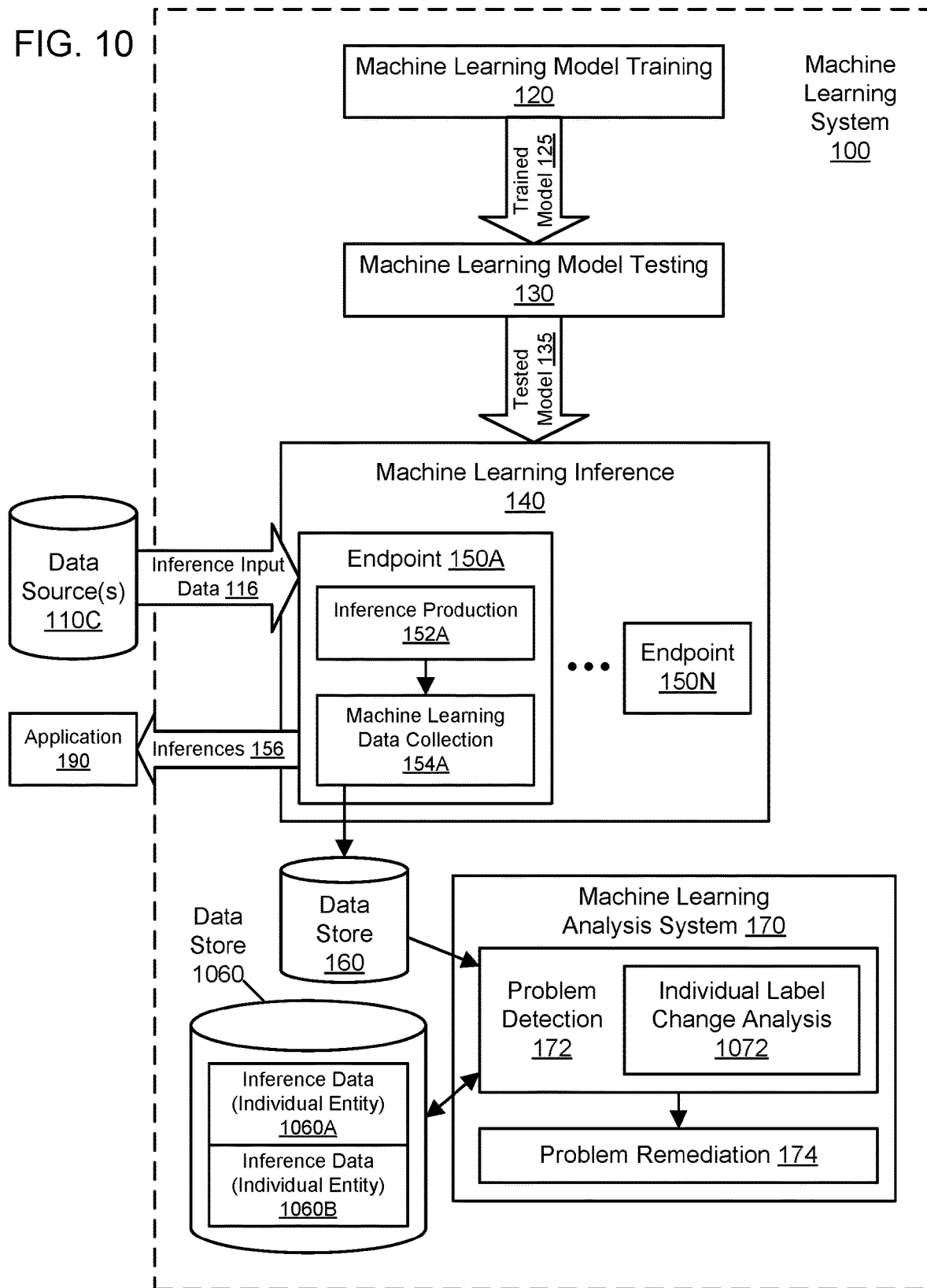
FIG. 10 illustrates further aspects of the example system environment for automated problem detection for machine learning models, including individual label change analysis for a machine learning model, according to some embodiments.

FIG. 10 illustrates further aspects of the example system environment for automated problem detection for machine learning models, including individual label change analysis for a machine learning model, according to some embodiments. In one embodiment, the analysis 172 may automatically detect problems or anomalies such as label changes for individual entities. Individual label change analysis 1072 may be applied to a collection of inference requests for individual entities in the input data. To detect changes in individual labels, the analysis 1072 may collect inference payloads and corresponding responses (e.g., the predictions output by the model) along with unique identifiers for individual entities and accumulate the data in a data store 1060. The data may 1060 be subjected to individual label change analysis 1072 for chunks of data associated with particular windows of time and according to a schedule, e.g., every twenty-four hours. The individual label change analysis 1072 may take the most recent chunk of data 1060B and join it with the prior chunk 1060A using the unique identifier for an individual entity. The individual label change analysis 1072 may be particularly applicable for daily batch inferences or recurring predictions. For regression problems, the individual label change analysis 1072 may bucket each score and entity, e.g., to map the prediction to different buckets for classification purposes. For example, different buckets may represent different ranges of scores. The individual label change analysis 1072 may determine, for each entity, whether the entity remained in the same bucket or instead changed buckets from one time period to the next. The individual label change analysis 1072 may generate alerts about potential problems based on appropriate thresholds, e.g., if 20% or more of entities moved buckets.

Figure 11:
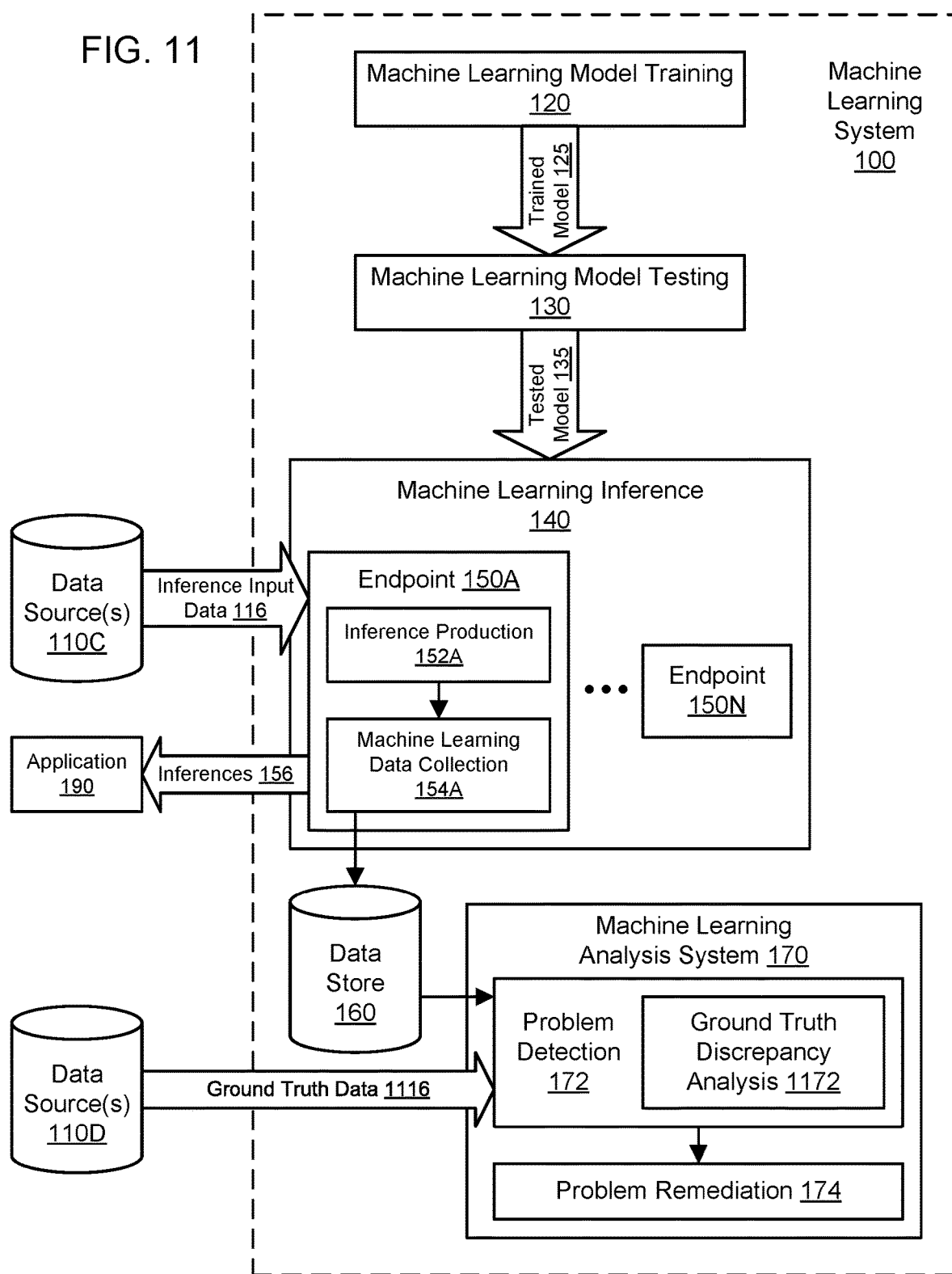
FIG. 11 illustrates further aspects of the example system environment for automated problem detection for machine learning models, including ground truth discrepancy analysis for a machine learning model, according to some embodiments.

FIG. 11 illustrates further aspects of the example system environment for automated problem detection for machine learning models, including ground truth discrepancy analysis for a machine learning model, according to some embodiments. In one embodiment, the analysis 172 may automatically detect problems or anomalies such as ground truth discrepancies. For some models, users or automated systems may collect the ground truth 1116 at a later time. Ground truth values 1116 may represent observed, real-world outcomes. For example, if a model 135 predicts the likelihood of a particular user clicking on a particular advertisement in a web browser, then the ground truth for that prediction may be an actual click or an eventual time-out without a click. As another example on a longer timeframe, if a model 135 predicts the likelihood of a particular homeowner defaulting on a home loan during the next twelve months, then the ground truth for that prediction may not be gathered for another year. Ground truth discrepancy analysis 1172 may be applied to a collection of inferences for which ground truth values 1116 are known (explicitly or implicitly). To detect discrepancies in ground truth data 1116 in comparison to predictions, the analysis 1172 may join the prediction (including the output of the model with a unique identifier) with a later-collected ground truth value. The ground truth discrepancy analysis 1172 may generate an alert if the discrepancy is above a threshold. The threshold may be based (at least in part) on the accuracy of training data 112 or on a user-specified value. In some embodiments, the ground truth discrepancy analysis 1172 may take into account ground truth overrides. A ground truth override may indicate that a user chose to override the prediction of a model in an application, e.g., when a user identifies the prediction as incorrect.

Debugging and Profiling of Machine Learning Model Training

Figure 12A:
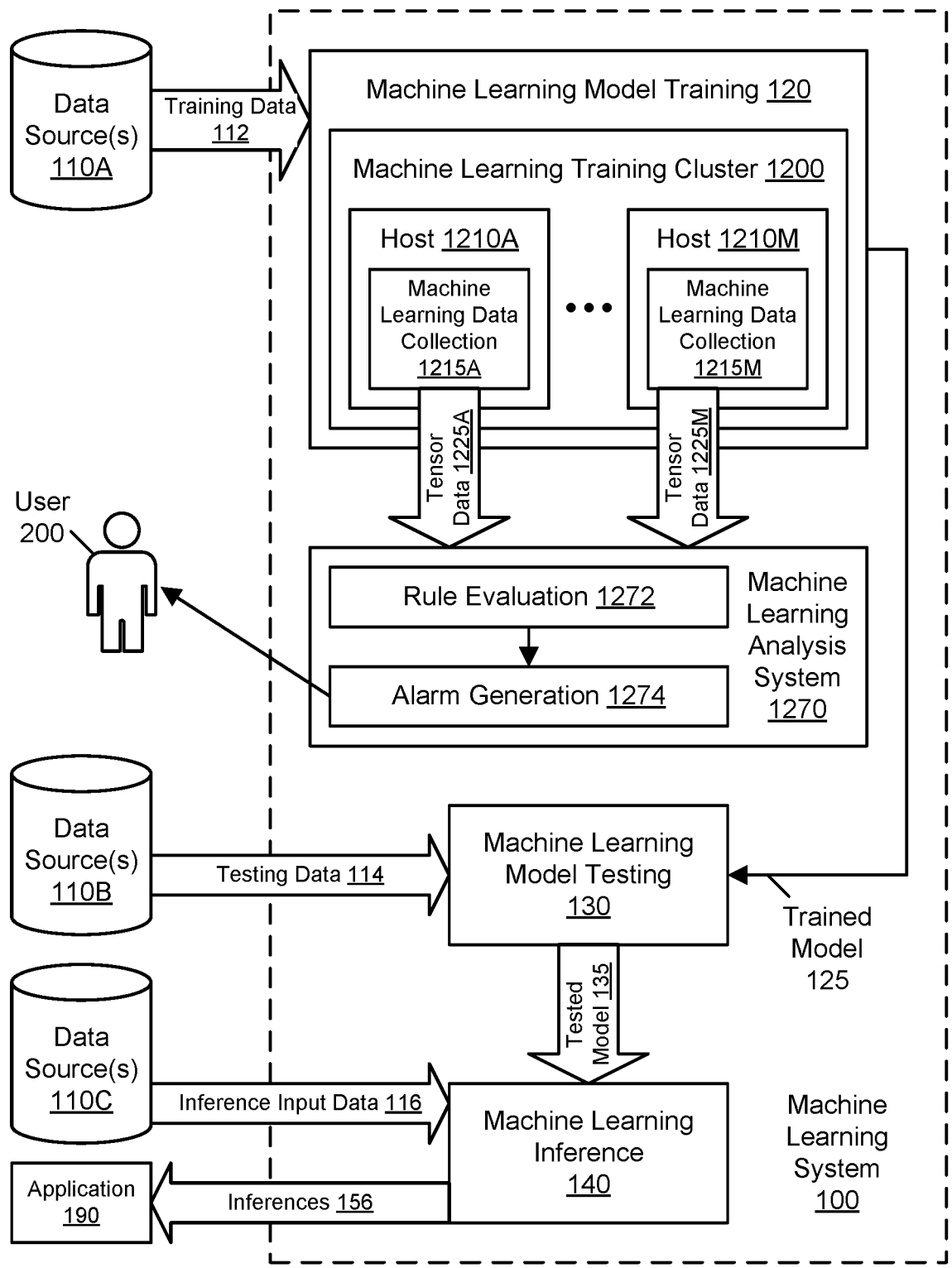
FIG. 12A and FIG. 12B illustrate an example system environment for debugging of machine learning model training using tensor data, according to some embodiments.
Figure 12B:
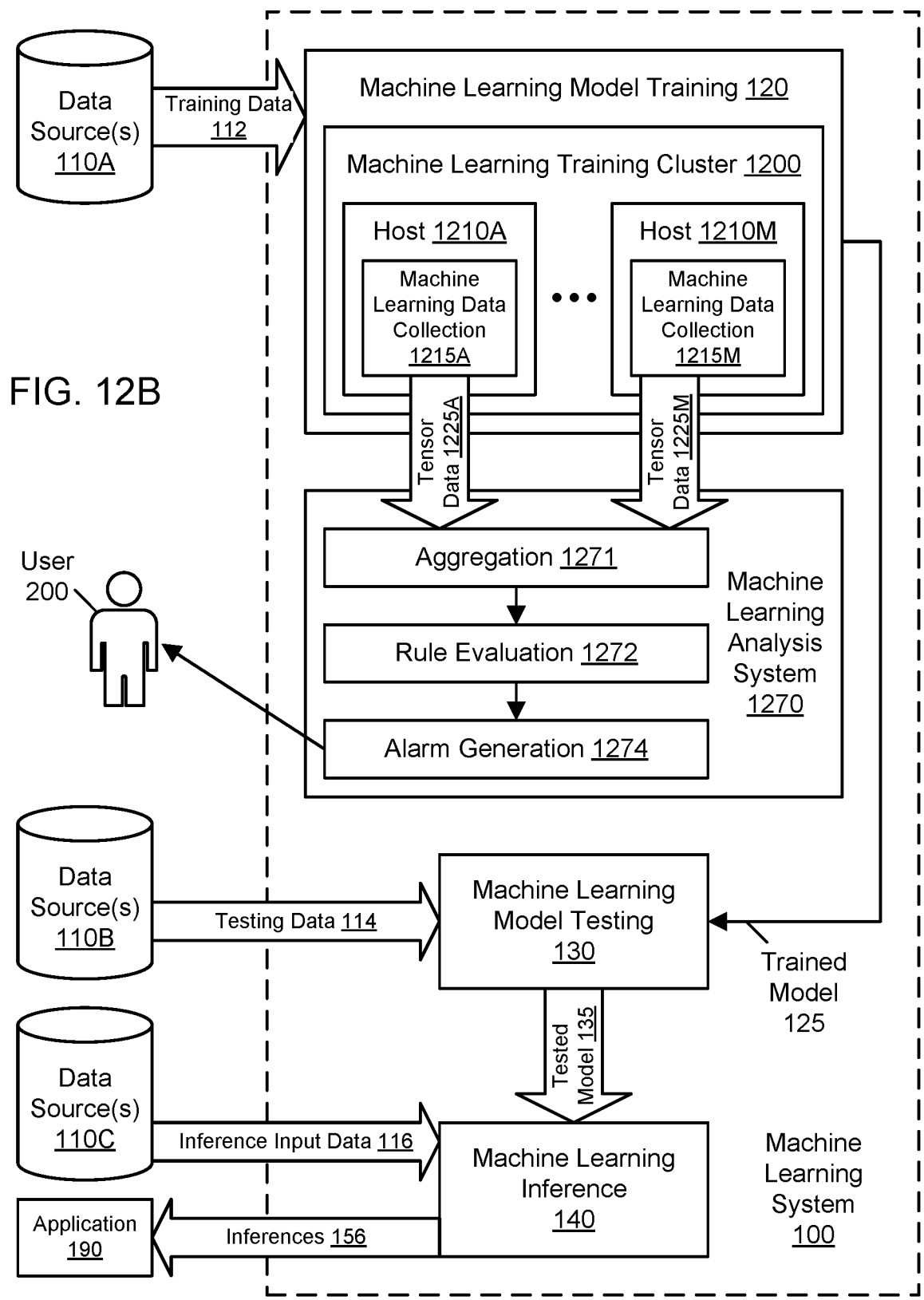

FIG. 12A and FIG. 12B illustrate an example system environment for debugging of machine learning model training using tensor data, according to some embodiments. As discussed above with respect to FIG. 1, a machine learning system 100 may manage the use of machine learning models on behalf of clients. A machine learning model may be associated with three stages or phases: a training phase where the model is trained, a testing phase where the model is tested, and an inference phase where the model is applied to live data to produce inferences (predictions). In various embodiments, the machine learning system 100 may perform machine learning model training tasks 120, machine learning model testing tasks 130, and machine learning inference tasks 140. The machine learning model training 120 may utilize training data 112 from one or more data sources 110A and may produce a trained model 125. The machine learning model testing 130 may test the trained model 125 using testing data 114 from one or more data sources 110B and may produce a tested model 135. The machine learning inference system 140 may apply the tested model 135 to inference input data 116 from one or more data sources 110A and may produce inferences 156.

In some embodiments, a machine learning model may be associated with a collection of weights trained against a corpus of data, which has "learned" how to apply those weights to classify or interpret a new sample of data. The training process may be iterative with numerous phases or steps that lead to a convergence if the training is successful. Along with the set of training data 112, the training process 120 may use a learning algorithm to produce a trained model. The training data 112 may include input features along with the correct prediction (a target or target attribute) based on those features. During the training 120, the learning algorithm may find patterns in the training data that map the input data features to the target, and the training 120 may output a model that captures these patterns. For example, the training system 120 may generate a trained model 125 that can determine the likelihood of particular users clicking on particular advertisements in a web browser or other internet-enabled interface. The input to such a model 125 may represent unique user identifiers, user demographic information, ad click histories for individual users, and so on. The inferences produced by such a model may represent probability values or labels. As another example, the training system 120 may generate a trained model 125 that can determine whether to offer home loans to applicants. The input to such a model may represent unique user identifiers, user income data, user credit histories, and so on. The inferences produced by such a model 125 may represent scores indicative of the attractiveness of individual applicants for the loans.

Data sources 110A, 110B, and 110C may include one or more database systems, data stores, tables, repositories, storage services, sources of streaming data, servers, memory locations, and so on. The training data 112 may be gathered by users or automated systems and used as input to an initial machine learning model to prepare the model to produce predictions. The training data 112 may be formatted according to a schema using a transformation task. Similarly, the testing data 114 may be gathered by users or automated systems and used as input to a trained machine learning model 125 to verify that the model produces correct inferences. The testing data 114 may also be formatted according to the schema using a transformation task. The inference input data 116 may represent real-world data, may be gathered by users or automated systems, and may be used as input to the tested machine learning model 135 to produce predictions about real-world behavior. The inference data 116 may be formatted according to the schema using a transformation task.

The training 120, testing 130, and inference 140 phases may be implemented in the same execution environment or in different execution environments. For example, in one embodiment, a unified machine learning framework may perform the training 120, testing 130, and inference 140 in a hosted environment on behalf of clients. In some embodiments, training 120 and/or testing tasks 130 may be performed by clients using client-hosted servers to produce a model, and that model may be used to produce inferences in a hosted environment on behalf of a client. In some embodiments, the training 120 and/or testing tasks 130 may be performed in a hosted environment on behalf of a client, and the inference tasks 140 may be performed in an external environment (e.g., using client-hosted servers or using another machine learning framework). Any of the training 120, testing 130, and inference 140 components may represent individual systems or subsystems that are loosely coupled or decoupled from one another.

The training system 120 may use a machine learning training cluster 1200 to generate a trained model 125. The cluster 1200 may include one or more hosts such as host 1210A through host 1210M. The hosts 1210A-1210M may represent the same or similar configurations (e.g., CPU, GPU, memory, local storage, and so on) and may be used in parallel for training of a model 125. For example, each host may store and use a tensor during a particular step of the model training process. The tensors may vary from host to host. In one embodiment, a tensor is a mathematical object that represents a higher-dimensional form of objects such as scalars, vectors, and matrices. A tensor may represent an N-dimensional matrix. For example, an image in the training data 112 may have three dimensions: width, height, and color depth. A series of images may be stored using a four-dimensional tensor, with the fourth dimension representing the sample size of the training data. Other examples of tensors used by the training process 120 may include tens, hundreds, or thousands of dimensions. For such tensors, the number of individual values may be very large (e.g., millions).

In one embodiment, each host may include a component for machine learning data collection to collect data associated with the training of the machine learning model 125 during the training process. For example, host 1210A may include a data collection component 1215A, and host 1210M may include a data collection component 1215M. The data collection components 1215A-1215M may represent instances of agent software that are executable by the respective hosts 1210A-1210M. In some embodiments, the system 100 may automatically insert probe points for data capture. The data collection components 1215A-1215M may capture tensor-level data associated with model training such as tensor data for a particular step of the training process. For example, data collection component 1215A may generate tensor data 1225A, and data collection component 1215M may generate tensor data 1225M. The tensor-level data may represent numerical values. The tensor data 1225A-1225M may represent the individual values for an N-dimensional tensor. The tensor data 1225A-1225M may represent one or more inputs, one or more outputs, and/or one or more intermediate values or states, one or more weights, and/or one or more activations for a step of the training process. The tensor data 1225A-1225M may also represent metadata associated with the training process, e.g., a learning algorithm identifier, a learning step number, a timestamp, a container identifier, a host identifier, a cluster identifier, and/or other information usable to perform debugging of the training process.

The data collection 1215A-1215M may not necessarily collect machine learning data for all tensors but may instead capture a sample. The sampling rate may represent a default rate or may be specified by a client associated with the machine learning model, e.g., using a monitoring configuration provided by the client. By sampling the data, the data collection 1215A-1215M may reduce its impact on the latency of the training 120. In some embodiments, clients may also enable or disable data collection 1215A-1215M on a model-by-model, step-by-step, or host-by-host basis.

The data collection components 1215A-1215M may store the captured data using locally accessible storage resources of the corresponding hosts 1210A-1210M. To perform debugging of the model training 120, a machine learning analysis system 1270 may retrieve the captured data (e.g., tensor data 1225A-1225M). In some embodiments, the captured data may be written by the hosts 1210A-1210M to a data store external to the cluster 1200, e.g., as managed by a storage service of a provider network, and the analysis system 1270 may retrieve the captured data from that data store. The data store (including the particular storage location, bucket, or account within the data store) and other data collection parameter values may be identified by a user 200 associated with the model 125. In some embodiments, the captured data may be streamed from the cluster 1200 to the analysis system 1270. By decoupling the analysis system 1270 from the model training 120, the latency impact of the analysis on the model training may be reduced.

The machine learning analysis system 1270 may use the collected tensor data 1225A-1225M to perform automated analysis of the model training 120. In some embodiments, the analysis may be performed according to thresholds, and thresholds (and other customization of the analysis) may be specified by a client associated with the machine learning model, e.g., using an analysis configuration provided by the client in a user interface or programmatic interface. The analysis 1270 may be performed at appropriate times, e.g., after a step of the model training 120 has been completed and the captured data has been emitted by the cluster 1200. The analysis system 1270 may include a component for automated rule evaluation 1272 that attempts to find one or more types of conditions, problems, anomalies, or other behavior in the model training 120 by evaluating one or more rules. The rules may represent assertions about the state of the training process 120, e.g., such that a particular rule may be matched if a particular value in the captured data exceeds a threshold. For example, using the rules in this manner, a user 200 may be assured that a particular value is within minimum and maximum bounds, and the user may be alerted if the value violates those assertions.

In some embodiments, custom rules may be provided by users and evaluated by the analysis system 1270. In some embodiments, a set of default rules may be evaluated. The default rules may represent common problems and other conditions with model training such as exploding gradients, vanishing gradients, data distribution changes in the training data 112 from step to step or batch to batch, data distribution changes in the training data from host to host, overflow conditions, underflow conditions, BatchNorm instability, faulty or incompatible implementations of operators, and so on. For example, a data distribution problem may be detected if a set of "cat" images are provided to one GPU while a set of "dog" images are provided to another GPU for the same batch. As another example, a problem may be detected when a tensor is all zeroes. As yet another example, exploding gradients may represent a problem in which large error gradients accumulate and result in very large updates to model weights during training. The effect of an exploding gradient may be a model that is unstable and unable to learn from the training data 112. Similarly, vanishing gradients may represent a problem in which the gradient is vanishingly small, such that the weight is prevented from changing its value and further training is obstructed. Thus, detection of the exploding gradient problem or vanishing gradient problem as early as possible may permit a user 200 to interrupt or stop the training process 120 before excessive time and cluster resources are used for a model training process that is nearly certain to fail eventually.

The captured data 1225A-1225M may be summarized and/or aggregated prior to performing the rule evaluation 1272. Aggregating the captured data 1225A-1225M may include collecting and bundling the data from a set of hosts 1210A-1210M so that the analysis 1270 can gain a broader view of the training process 120. Aggregating the captured data 1225A-1225M may include generating summarized forms of the data, e.g., by applying reduction operators to determine minimum values, maximum values, average values, and so on. In some embodiments, aspects of the aggregation may be performed at the cluster 1200, e.g., by summarizing tensor data at individual hosts 1210A-1210M. In some embodiments, aspects of the aggregation may be performed at the analysis system 1270. As shown in the example of FIG. 12B, the analysis system 1270 may include a component for aggregation 1271. The aggregation component 1271 may bundle data captured by individual hosts and/or summarize sets of captured data.

The analysis system 1270 may include a component 1274 for alarm generation. The alarm generation 1274 may be used to raise or generate alarms or alerts when particular conditions or problems with the training 120 are detected using the rule evaluation 1272. The alarm component 1274 may generate alarms that describe detected conditions or problems with machine learning model training or training data. An alarm may indicate, for example, the type of problem or condition, the date or window of time in which the problem or condition was encountered, a model identifier, a model version number, a container identifier, a cluster identifier, a host identifier, problematic tensor data or a summary thereof, and/or other information useful to identify and remediate a problem or condition with machine learning training. The alarm component 1274 may provide a user 200 with sufficient information for the user to examine the inputs, outputs, and intermediate steps of particular training steps. In one embodiment, the alarm component 1274 may send notifications, alerts, or other messages to a console or notification system (e.g., notification system 290) to which the user 200 has access. The console or notification system may represent a service in a cloud computing environment or other provider network that collects notifications and metrics from multiple services used by a user account and funnels them to that user account. The notification system may, for example, page or e-mail a user 200 associated with the model when the alarm is generated.

An alarm regarding a model training process 120 may be raised before excessive resources have been used in the training, e.g., for a model that is not converging. Accordingly, based (at least in part) on an alarm, the training 120 may be interrupted or discontinued in order to conserve resources of the cluster 1200. Based (at least in part) on an alarm, the cluster 1200 may be deprovisioned or its use otherwise halted. Based (at least in part) on an alarm, a configuration of the model training 120 may be modified to remediate the detected problem(s), and the training may then be restarted with the modified configuration. Based (at least in part) on an alarm, root cause analysis may be performed to determine the root causes of detected problems in the model training 120.

In various embodiments, the analysis system 1270 may be hosted in the same execution environment as the training system 120 or in a different execution environment than the inference system. For example, the analysis 1270 may be part of the same provider network or machine learning framework as the training cluster 1200. As another example, the analysis 1270 may be hosted in a cloud computing environment, and the training cluster 1200 may be hosted remotely on client premises (or in a different machine learning framework) and may be configured to perform the data collection 1215A-1215M and write the inference data in an expected format to a data store (or otherwise provide the data to the analysis system).

In some embodiments, a machine learning model 125 being trained may be encapsulated in a container for execution in a containerized environment. In some embodiments, the program code of the container or the learning algorithm need not be modified in order to perform the data collection 1215A-1215M or rule evaluation 1272. An execution environment may include or be associated with one or more systems, services, or other components that implement machine learning tasks. Any of the systems, services, or other components of an execution environment may be built on one or more computing devices such as the example computing device 3000 as illustrated in FIG. 21. The execution environments may vary in terms of their underlying configurations. In one embodiment, the execution environments may include MapReduce-based cluster computing environments, stream processing systems, workflow systems such as Amazon Simple Workflow Service, and other suitable environments. In one embodiment, an execution environment may be implemented using a cluster 1200 of computing devices that cooperate to execute machine learning tasks. A cluster 1200 may be provisioned, launched, or otherwise spun up in order to perform one or more machine learning tasks. In one embodiment, a particular execution environment may use an orchestration framework such as Apache Hadoop, Apache Spark, and so on to manage a cluster.

The machine learning system 100, including the cluster 1200 and/or analysis system 1270, may be implemented using any suitable number and configuration of computing devices, any of which may be implemented by the example computing device 3000 illustrated in FIG. 21. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

Figure 13:
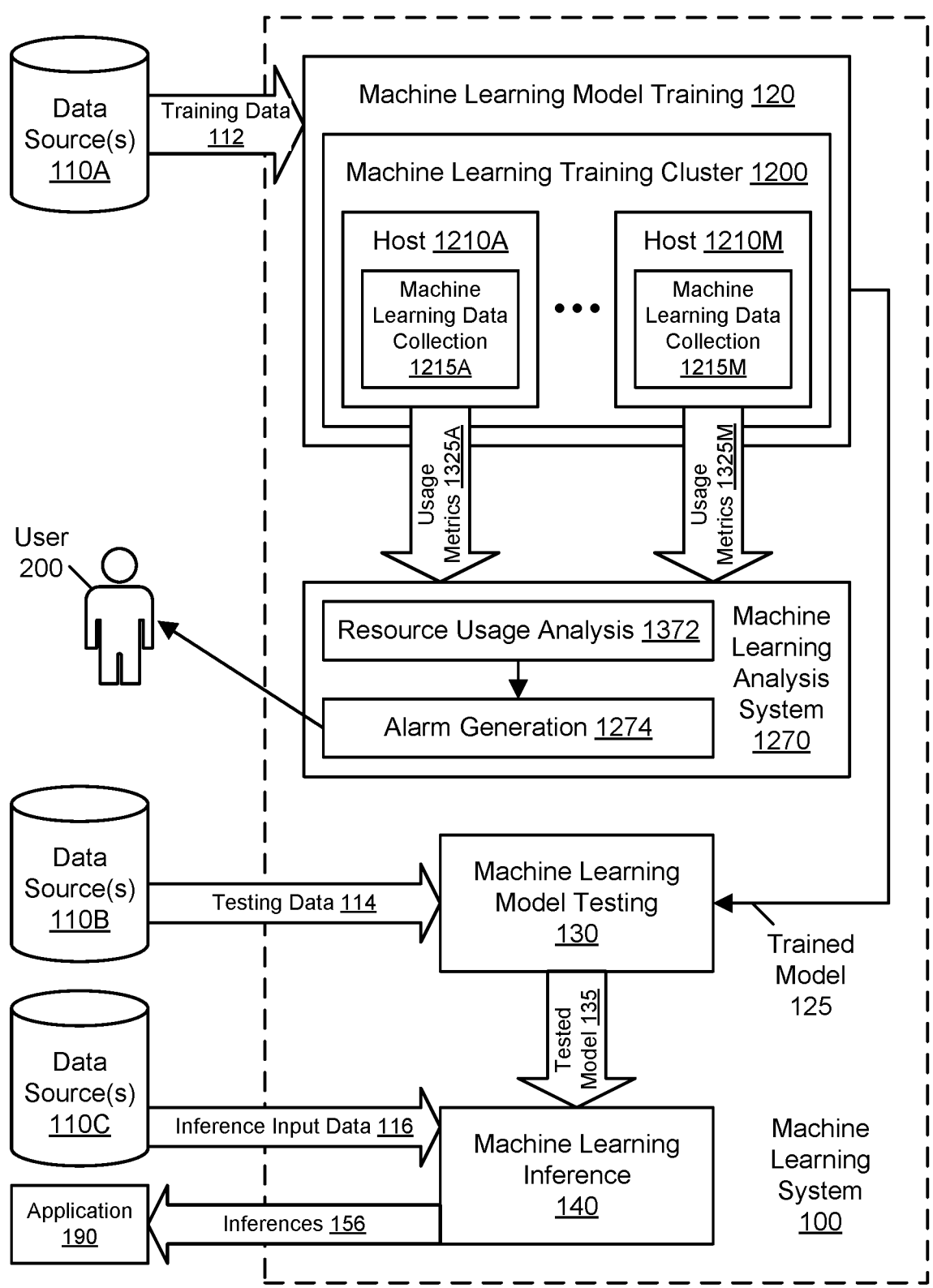
FIG. 13 illustrates an example system environment for profiling of machine learning model training using usage metrics, according to some embodiments.

FIG. 13 illustrates an example system environment for profiling of machine learning model training using usage metrics, according to some embodiments. As discussed above, each host may include a component for machine learning data collection to collect data associated with the training of the machine learning model 125 during the training process. In some embodiments, the data collection components 1215A-1215M may capture resource utilization data associated with model training. As shown in FIG. 13, data collection component 1215A may generate usage metrics 1325A, and data collection component 1215M may generate usage metrics 1325M. The collected usage data 1325A-1325M may include data usable for performance profiling such as processor usage metrics, memory usage metrics, storage usage metrics, I/O metrics, network usage metrics, and so on. Elements of the usage data 1325A-1325M may be associated with particular steps or intermediate states of the training process. The usage data 1325A-1325M may also represent metadata associated with the training process, e.g., a learning algorithm identifier, a learning step number, a timestamp, a container identifier, a host identifier, a cluster identifier, and/or other information usable to perform profiling of the training process.

The data collection components 1215A-1215M may store the captured usage data using locally accessible storage resources of the corresponding hosts 1210A-1210M. To perform profiling of the model training 120, the machine learning analysis system 1270 may retrieve the usage data 1325A-1325M. In some embodiments, the usage data may be written by the hosts 1210A-1210M to a data store external to the cluster 1200, e.g., as managed by a storage service of a provider network, and the analysis system 1270 may retrieve the usage data from that data store. The data store (including the particular storage location, bucket, or account within the data store) and other data collection parameter values may be identified by a user 200 associated with the model 125. In some embodiments, the usage data may be streamed from the cluster 1200 to the analysis system 1270. By decoupling the analysis system 1270 from the model training 120, the latency impact of the analysis on the model training may be reduced.

The machine learning analysis system 1270 may use the collected usage data 1325A-1325M to perform automated analysis of the model training 120. In some embodiments, the analysis may be performed according to thresholds, and thresholds (and other customization of the analysis) may be specified by a client associated with the machine learning model, e.g., using an analysis configuration provided by the client in a user interface or programmatic interface. The analysis 1270 may be performed at appropriate times, e.g., after a step of the model training 120 has been completed and the usage data has been emitted by the cluster 1200. The analysis system 1270 may include a component for automated resource usage analysis 1372 that attempts to find one or more types of problems, anomalies, or other flaws in the performance or resource usage of the model training 120. The resource usage analysis 1372 may include evaluation of one or more rules. The rules may represent assertions about the state of the training process 120, e.g., such that a particular rule may be matched if a particular value in the usage data exceeds a threshold.

The usage analysis 1372 may detect performance problems or other usage-related conditions in the cluster 1200, e.g., by determining that CPU usage, GPU usage, memory usage, storage usage, I/O, and/or network usage exceeds a predetermined threshold or otherwise matches a rule. If performance of the cluster 1200 is beneath expectations, then the usage analysis 1372 may identify one or more hardware components of the cluster 1200 as performance bottlenecks. For example, storage I/O or image preprocessing on the CPU may be identified as a bottleneck in training for one or more of the hosts 1210A-1210M. As another example, the length of samples may be detected such that one GPU represents a bottleneck. As a further example, the analysis 1372 may detect whether all GPUs were used or may determine the per-batch runtime difference across GPUs. The usage analysis 1372 may measure the speed of the model training and/or compare the speed or other runtime performance attributes of one portion of the training process against another portion. Using metadata associated with the usage data, the usage analysis 1372 may tie particular performance problems and conditions in the cluster 1200 to particular steps or intermediate states of the training process 120.

The usage data 1325A-1325M may be summarized and/or aggregated prior to performing the rule evaluation 1272. Aggregating the usage data 1325A-1325M may include collecting and bundling the usage data from a set of hosts 1210A-1210M so that the analysis 1270 can gain a broader view of the training process 120. Aggregating the usage data 1325A-1325M may include generating summarized forms of the data, e.g., by applying reduction operators to determine minimum values, maximum values, average values, and so on. In some embodiments, aspects of the aggregation may be performed at the cluster 1200, e.g., by summarizing usage data at individual hosts 1210A-1210M. In some embodiments, aspects of the aggregation may be performed at the analysis system 1270.

As discussed above, the analysis system 1270 may include a component 1274 for alarm generation. The alarm generation 1274 may be used to raise or generate alarms or alerts when conditions or problems with the training 120 are detected using the usage analysis 1372. The alarm component 1274 may generate alarms that describe detected conditions or problems with the performance of machine learning model training in the cluster 1200. An alarm may indicate, for example, the type of condition or problem, the date or window of time in which the condition or problem was encountered, the performance threshold that was violated, the rule that was matched in the rule evaluation, a model identifier, a model version number, a container identifier, a cluster identifier, a host identifier, a training step number, and/or other information useful to identify and remediate a problem with the performance of machine learning training. Based (at least in part) on a performance alarm, the training 120 may be interrupted or discontinued in order to conserve resources of the cluster 1200. Based (at least in part) on a performance alarm, the cluster 1200 may be deprovisioned or its use otherwise halted. Based (at least in part) on a performance alarm, the model training 120 or cluster 1200 configuration may be modified to remediate the detected problem(s) and then restarted for improved training. In some embodiments, the analysis system 1270 may use the collected usage data to provide visibility into the performance of the model training even in the absence of problems. For example, the analysis system 1270 may interactively display performance information (e.g., execution times, GPU utilization, and so on) during training, down to a user-selected level of granularity for the cluster, hosts, training steps, and so on.

Figure 14:
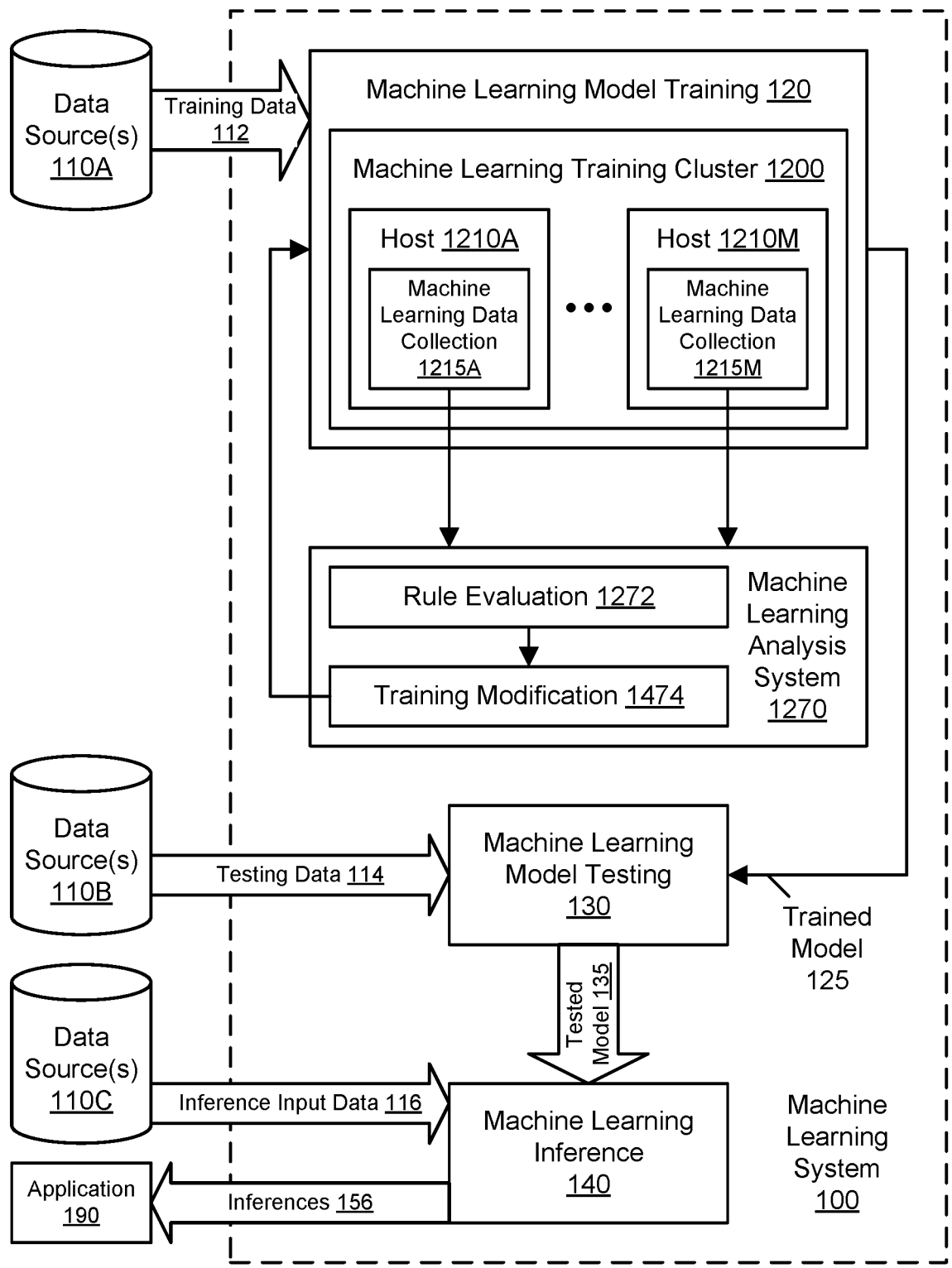
FIG. 14 illustrates further aspects of the example system environment for debugging of machine learning model training using tensor data, including modification of model training according to results of an analysis, according to some embodiments.

FIG. 14 illustrates further aspects of the example system environment for debugging of machine learning model training using tensor data, including modification of model training according to results of an analysis, according to some embodiments. The machine learning analysis system 1270 may include a component 1474 for training modification. The training modification 1474 may represent one or more actions taken to remediate detected problems and/or improve the training. In some embodiments, aspects of the training modification 1474 may be initiated by a user 200. In some embodiments, aspects of the training modification 1474 may be initiated automatically by the analysis system 1270, e.g., in the absence of direct user input to initiate or approve the training modification. The training modification 1474 may include generating a new or modified training data set and restarting the training with that data set. For example, if the analysis 1270 determines that particular input features have no impact on predictions, then the new training set may exclude those features. The training modification 1474 may include selecting or generating a new or modified training algorithm and restarting the training with that data set. For example, if the analysis system 1270 has detected data distribution changes from host to host or from batch to batch in the original training data 112, then training may be restarted using a new training data set that does not reflect such distribution changes. The training modification 1474 may include modifications to the cluster 1200, e.g., by increasing or decreasing the number of hosts, changing the configuration of hosts, and so on. The training modification 1474 may include modifying aspects of a configuration of the training 120 such as a learning rate. For example, the learning rate may be configured initially for fast learning, but as the training begins to approach a solution, then the learning rate may be automatically reduced to slow down the rate at which information is absorbed.

Figure 15:
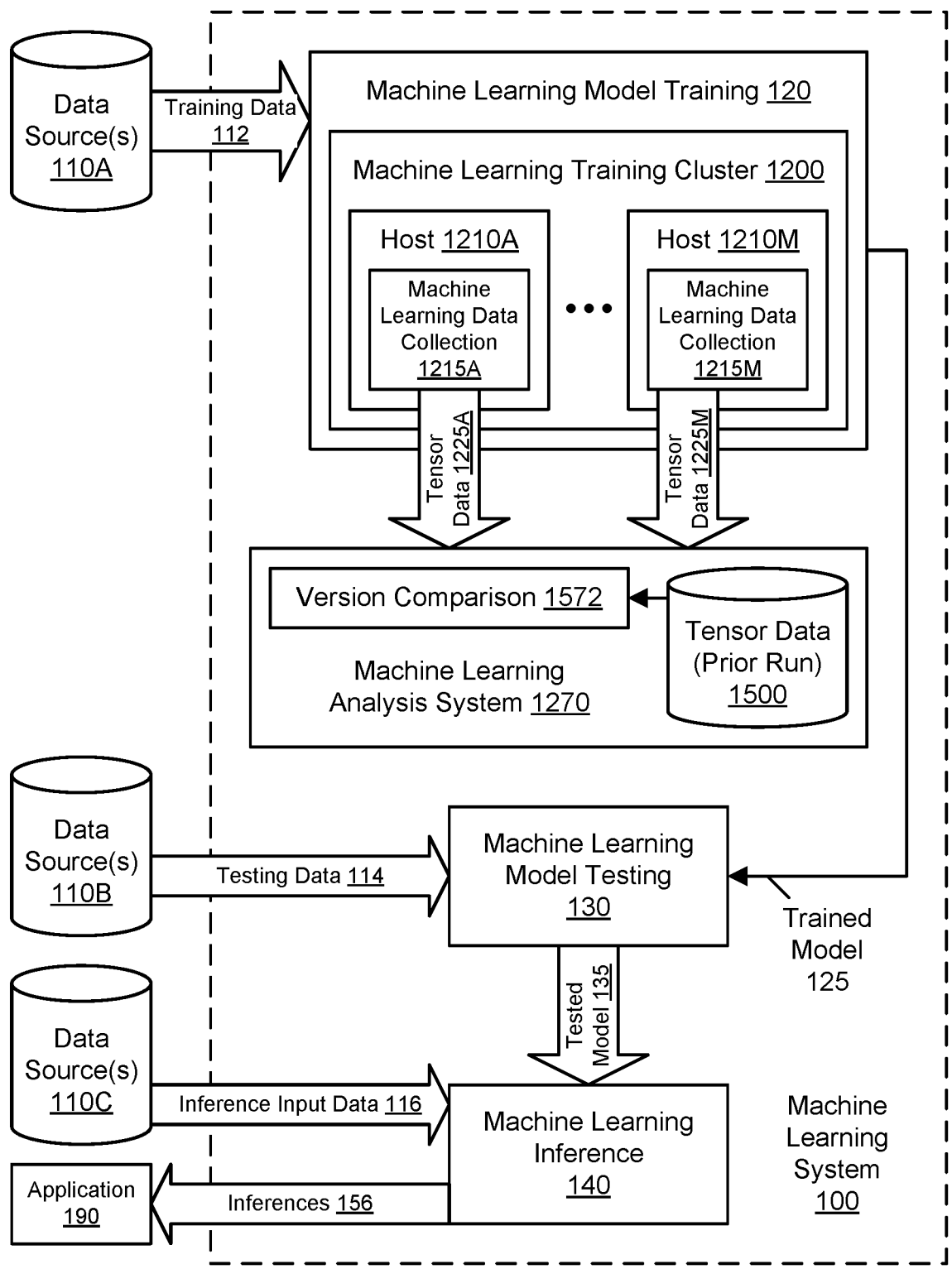
FIG. 15 illustrates further aspects of the example system environment for debugging of machine learning model training using tensor data, including version comparison using tensor data from a current run and tensor data from a prior run, according to some embodiments.

FIG. 15 illustrates further aspects of the example system environment for debugging of machine learning model training using tensor data, including version comparison using tensor data from a current run and tensor data from a prior run, according to some embodiments. In some embodiments, two different versions or instances of a model training process may be implemented, and the differences (if any) may be determined using a component 1572 for model training version comparison. For example, one version of a learning algorithm may be used to generate tensor data 1500 from a prior run of the model testing. The tensor data 1500 may be maintained in a data store accessible to the analysis system 1270. The learning algorithm may be modified and used for training again, with the second training process producing tensor data 1225A-1225M. In one embodiment, resource usage data may be generated for both runs of the training process. Using the version comparison 1572, the analysis system 1270 may determine any differences in the tensor data and/or usage metrics between the prior run of the training process and the subsequent run of the training process. In one embodiment, the version comparison 1572 may be used for A-B testing of data captured during training for two different clusters used concurrently. The comparison 1572 may generate metrics usable to compare the quality or performance of one model version or training process against the quality or performance of another model version or training process.

Figure 16:
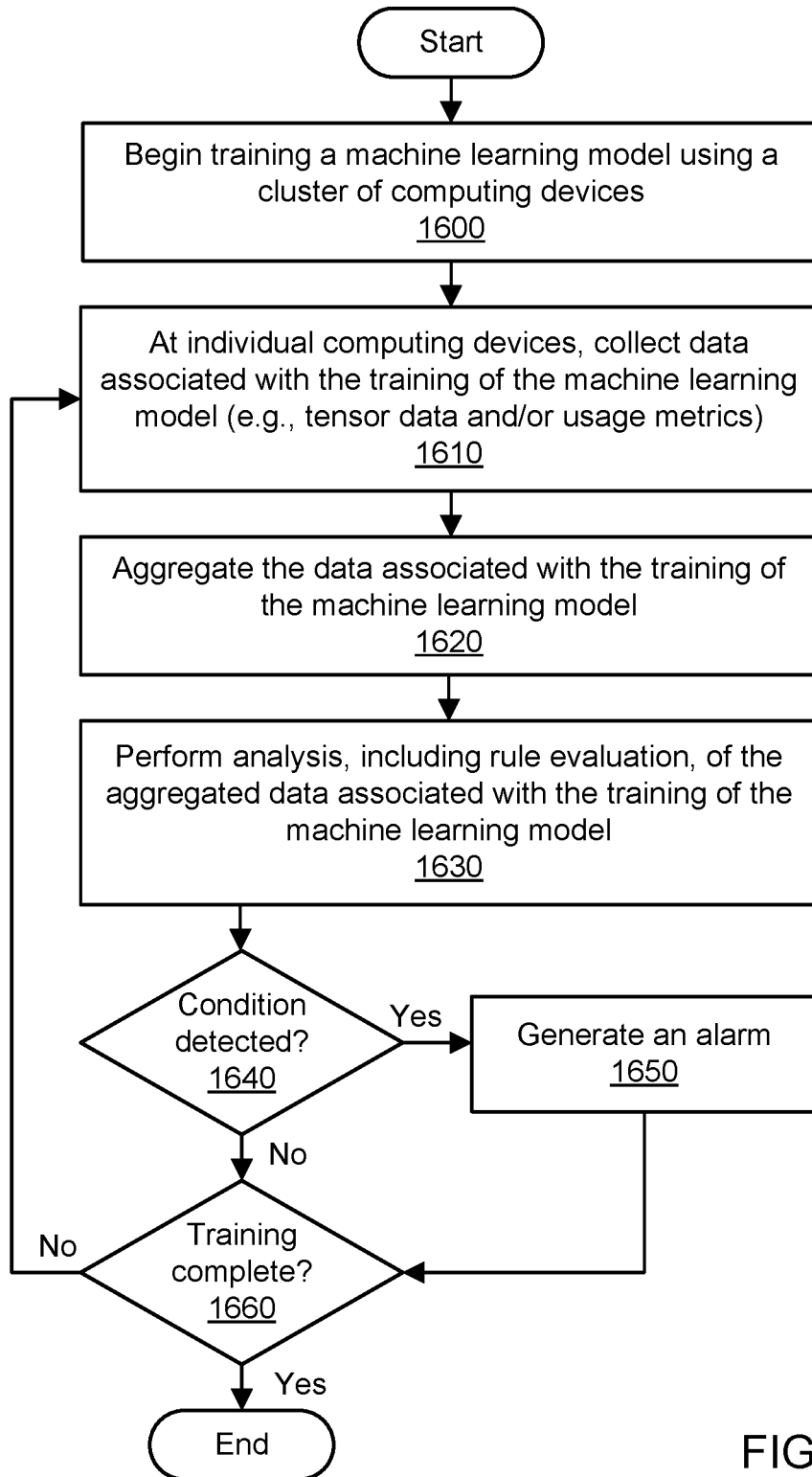
FIG. 16 is a flowchart illustrating a method for debugging and profiling of machine learning model training using tensor data, according to some embodiments.

FIG. 16 is a flowchart illustrating a method for debugging and profiling of machine learning model training using tensor data, according to some embodiments. As shown in 1600, the training of a machine learning model may be initiated. The training may use a cluster of computing devices (e.g., one or more hosts). The hosts may represent the same or similar configurations (e.g., CPU, GPU, memory, local storage, and so on) and may be used in parallel for training of a model. For example, each host may store and use a tensor during a particular step of the model training process. As shown in 1610, data associated with the training of the machine learning model may be collected at individual computing devices in the cluster. The data may be collected using instances of agent software. The data may represent tensor data usable for debugging and/or usage metrics usable for performance profiling. The tensor data may represent one or more inputs, one or more outputs, and/or one or more intermediate states for a step of the training process. The tensor data may also represent metadata associated with the training process, e.g., a learning algorithm identifier, a learning step number, a timestamp, a container identifier, a host identifier, a cluster identifier, and/or other information usable to perform debugging of the training process. The usage data may include data usable for performance profiling such as processor usage metrics, memory usage metrics, storage usage metrics, I/0 metrics, network usage metrics, and so on. The usage data may also represent metadata associated with the training process, e.g., a learning algorithm identifier, a learning step number, a timestamp, a container identifier, a host identifier, a cluster identifier, and/or other information usable to perform profiling of the training process.

As shown in 1620, the data associated with the training of the machine learning model may be aggregated. Aggregating the captured data may include collecting and bundling the data from the set of hosts so that the analysis can gain a broader view of the training process. Aggregating the captured data may include generating summarized forms of the data, e.g., by applying reduction operators to determine minimum values, maximum values, average values, and so on. In some embodiments, aspects of the aggregation may be performed at the cluster, e.g., by summarizing tensor data at individual hosts. In some embodiments, aspects of the aggregation may be performed at the analysis system itself.

As shown in 1630, analysis may be performed of the aggregated data by the analysis system. The analysis may include rule evaluation. The rules may represent assertions about the state of the training process, e.g., such that a particular rule may be matched if a particular value in the captured data exceeds a threshold. In some embodiments, custom rules may be provided by users and evaluated by the analysis system. In some embodiments, a set of default rules may be evaluated. The default rules for debugging may represent common problems with model training such as exploding gradients, vanishing gradients, data distribution changes in the training data from step to step or batch to batch, data distribution changes in the training data from host to host, overflow conditions, underflow conditions, BatchNorm instability, and so on. Rules for profiling may detect usage patterns that exceed predetermined thresholds, performance bottlenecks in the cluster, and so on.

As shown in 1640, the method may determine whether a particular condition or problem was detected with the training, e.g., if one or more rules indicating the particular problems or conditions were matched. If a problem or condition was detected, then as shown in 1650, an alarm may be generated. Alarms may describe detected problems and conditions with machine learning model training or training data. An alarm may indicate, for example, the type of problem or condition, the date or window of time in which the problem was encountered, a model identifier, a model version number, a container identifier, a cluster identifier, a host identifier, problematic tensor data or a summary thereof, and/or other information useful to identify and remediate a problem with machine learning training. An alarm regarding a model training process may be raised before excessive resources have been used in the training, e.g., for a model that is not converging. Accordingly, based (at least in part) on an alarm, the training may be interrupted or discontinued in order to conserve resources of the cluster. Based (at least in part) on an alarm, the cluster may be deprovisioned or its use otherwise halted. Based (at least in part) on an alarm, the model training may be modified to remediate the detected problem(s) and then restarted for improved training. Based (at least in part) on an alarm, root cause analysis may be performed to determine the root causes of detected problems in the model training. As shown in 1660, the method may determine whether the training is complete. If so, then the method may end. If not, then the method may continue with the operation shown in 1610.

GPU Code Injection to Summarize Machine Learning Training Data

Figure 17:
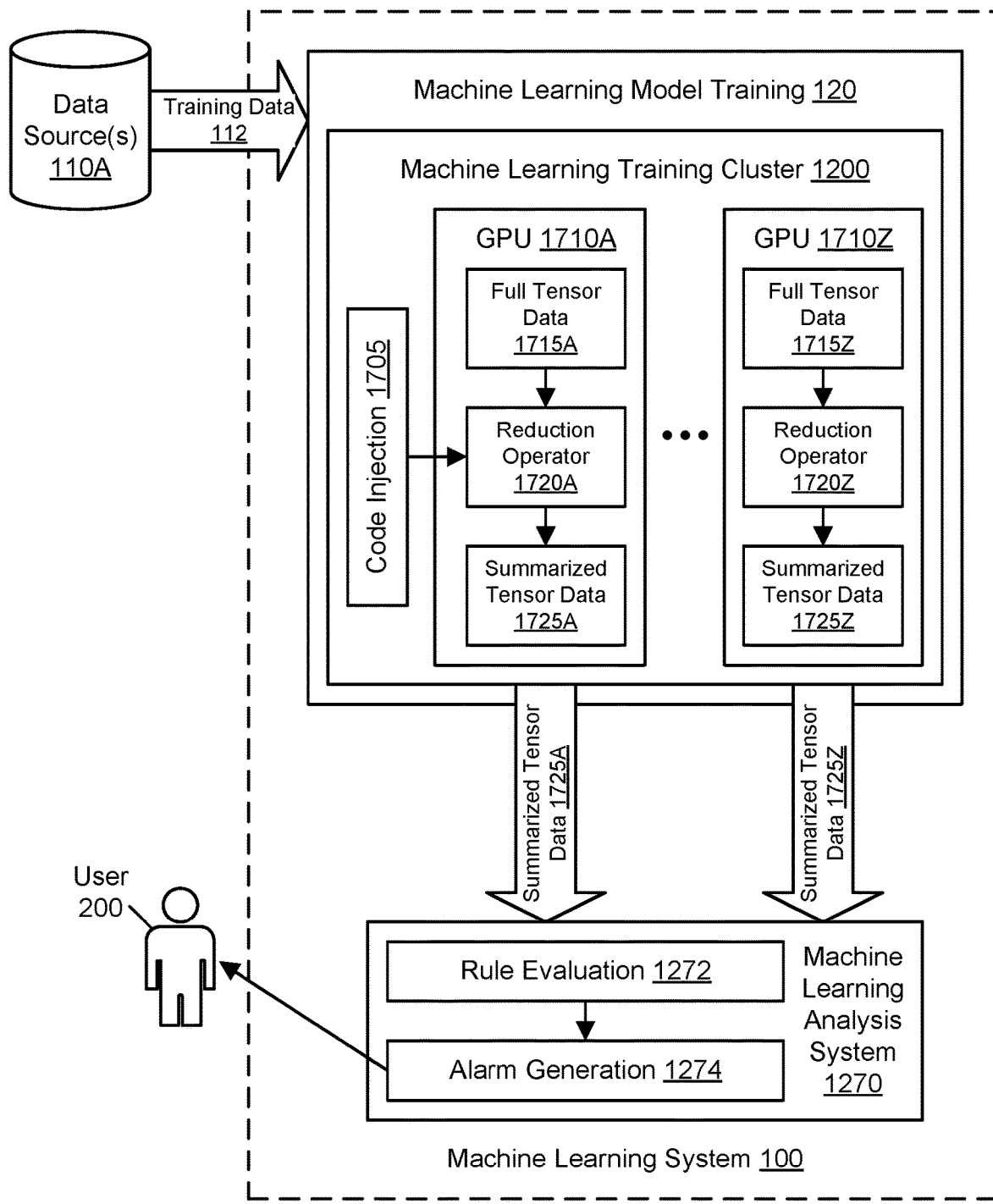
FIG. 17 illustrates an example system environment for GPU code injection to summarize machine learning training data, according to some embodiments.

FIG. 17 illustrates an example system environment for GPU code injection to summarize machine learning training data, according to some embodiments. As discussed above, the training system 120 may use a machine learning training cluster 1200 to generate a trained model 125. The cluster 1200 may include a plurality of graphics processing units (GPUs) such as host GPU 1710A through GPU 1710Z. The training process 120 may employ general-purpose GPU computing (GPGPU) techniques to take advantage of the parallelism offered by GPUs. In various embodiments, the GPUs 1710A-1710Z may be physically coupled to or included in the hosts 1210A-1210M or may instead represent remote "elastic" GPUs that are provided by a GPU virtualization service and accessed by the hosts 1210A-1210M via a network. The GPUs 1710A-1710Z may be used to process and store tensors. As discussed above, a tensor may represent an N-dimensional matrix. For example, an image in the training data 112 may have three dimensions: width, height, and color depth. A series of images may be stored using a four-dimensional tensor, with the fourth dimension representing the sample size of the training data. Other examples of tensors used by the training process 120 may include tens, hundreds, or thousands of dimensions. For such tensors, the number of individual values may be very large (e.g., millions).

During the training 120, tensor data associated with the training may be collected and written to local storage for individual hosts in the cluster. The training process may be iterative with numerous phases or steps, and data may be collected for each of those phases or steps. The collected data may include data usable for debugging such as inputs, outputs, tensor data, and metadata (e.g., a container identifier, a timestamp, and so on) associated with training. For example, a full set of tensor data may be produced on a GPU and stored in the memory of that GPU during a training step. For sufficiently large tensors, the full tensor data 1715A or 1715Z for a step may represent millions of individual values. If the full tensor data 1715A-1715Z is output by the GPU, saved to local storage at the corresponding host, and provided to a centralized analysis system 1270 over a network, then consumption of storage and network resources (e.g., may be high. If the full tensor data 1715A-1715Z is output by the GPUs 1710A-1710Z and summarized by the hosts 1210A-1210M of the cluster 1200, or if the full tensor data 1715A-1715Z is acquired by the analysis system 1270 and then summarized, then the summarization using CPU resources may be less efficient than summarization using GPU resources.

To reduce the quantity and size of tensor data used for analysis 1270, and to make more efficient use of processor resources for summarization, reduction operators 1720A-1720Z may be injected into GPUs 1710A-1710Z dynamically to produce summarized or aggregated forms of the tensor data. The cluster 1200 may include one or more components 1705 for code injection, e.g., for individual hosts and/or GPUs. Using the code injection 1705, a reduction operator may be provided to a GPU for execution using GPU resources, or an existing reduction operator of the GPU may be invoked. For example, the reduction operators 1720A-1720Z may produce the minimum value of a full set of tensor data, the maximum value of a full set of tensor data, the average value of a full set of tensor data, and so on. By performing the reduction on the GPU, a much smaller set of tensor data (e.g., a single value) may be output by the GPU instead of thousands or millions of individual values. For example, a reduction operator 1720A may be applied to full tensor data 1715A to produce summarized tensor data 1725A in the memory of the GPU 1710A. The summarized tensor data 1725A may be significantly smaller than the full tensor data 1715A in size and in number of values. Similarly, a reduction operator 1720Z may be applied to full tensor data 1715Z to produce summarized tensor data 1725Z in the memory of the GPU 1710A.

The reduction operators 1720A-1720Z may be the same or may vary from GPU to GPU and from tensor to tensor. For example, an average value may be desired for one tensor, while a maximum value may be desired for another tensor. The particular reduction operator for a particular tensor and particular training step may be selected according to a training configuration and/or according to a set of rules used for analysis 1270. As an extended example, the following tensors may be produced in training: x, y, weight, bias, product, y_hat, and cost. If the training process 120 lasts for eight steps (zero through seven), then the tensor x may be saved in full for steps 0 and 2, as a min and max form for step 4, and as a max form for step 6. The tensor y may be saved in full for steps 0 and 1, as a min form for step 3, and as a max form for step 5. The tensor weight may be saved in full for step 0 and as a min form for step 4. The tensor bias may be saved as a max form for step 1 and as a min form for step 3. The tensor product may be saved as an average form for steps 0 and 1. The tensor y_hat may be saved in full for step 0. The tensor cost may be saved in full for steps 0 through 7.

In one embodiment, the summarized tensor data 1725A-1725Z may be output by the GPUs 1710A-1710Z instead of the full tensor data 1715A-1715Z. The summarized tensor data 1725A-1725Z may be stored on the hosts 1210A-1210M using local storage resources before being provided to the analysis system 1270. By outputting only the summarized form of the tensor data, resource use may be minimized for local storage at the training cluster, remote storage at a repository of tensor data, local storage at the analysis system 1270, CPU resources at the training cluster or analysis system (that might otherwise be used to perform the summarization), and network bandwidth between any of the described components.

Figure 18:
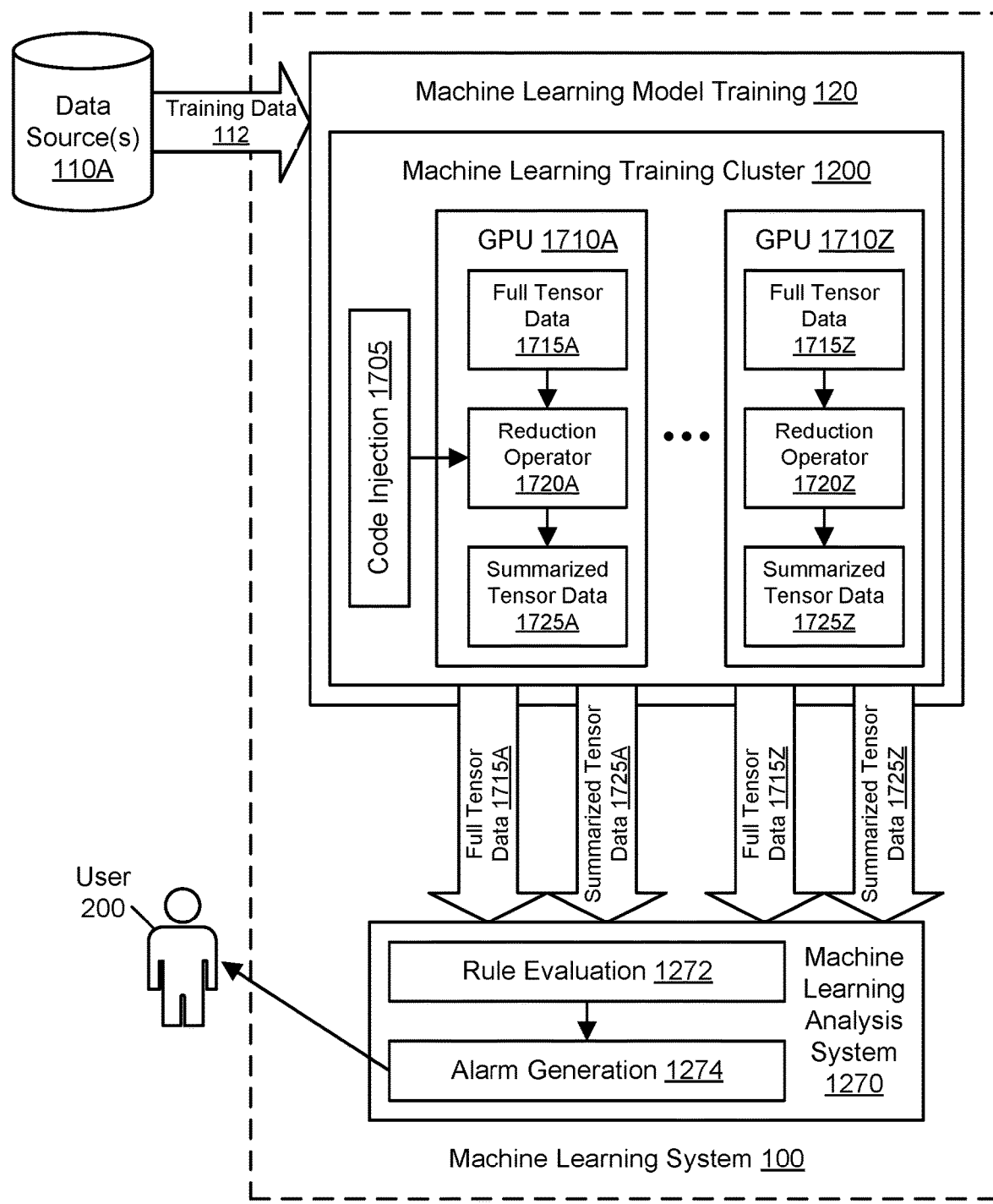
FIG. 18 illustrates further aspects of the example system environment for GPU code injection to summarize machine learning training data, including providing both the full and summarized forms of tensor data, according to some embodiments.

FIG. 18 illustrates further aspects of the example system environment for GPU code injection to summarize machine learning training data, including providing both the full and summarized forms of tensor data, according to some embodiments. In one embodiment, the summarized tensor data 1725A-1725Z may be output by the GPUs 1710A-1710Z in addition to the full tensor data 1715A-1715Z. For example, GPU 1710A may output both the full tensor data 1715A and the corresponding summarized tensor data 1725A, while GPU 1710Z may output both the full tensor data 1715Z and the corresponding summarized tensor data 1725Z. Both the full and summarized may be stored on the hosts 1210A-1210M using local storage resources before being provided to the analysis system 1270. By providing both the full and summarized forms of the tensor data to the analysis system 1270, the analysis may gain additional visibility into the training process 120. Additionally, by providing the summarized forms of the tensor data to the analysis system 1270, the summarized forms may be generated more efficiently using GPU resources than would be necessary to produce the equivalent summaries with the CPU resources of the analysis system or hosts 1210A-1210M.

Figure 19:
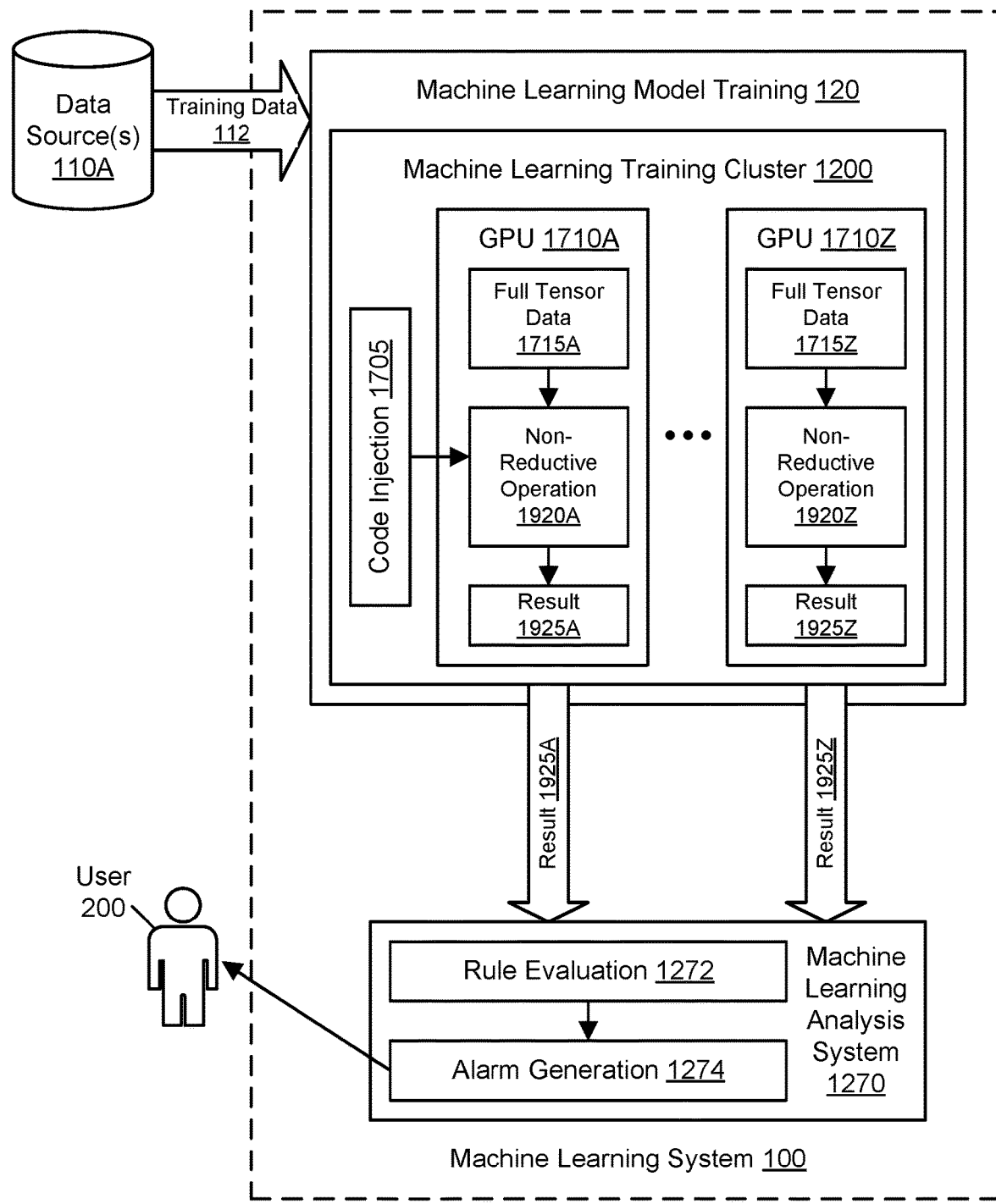
FIG. 19 illustrates further aspects of the example system environment for GPU code injection to summarize machine learning training data, including non-reductive operations performed by a GPU, according to some embodiments.

FIG. 19 illustrates further aspects of the example system environment for GPU code injection to summarize machine learning training data, including non-reductive operations performed by a GPU, according to some embodiments. In some embodiments, operations may be performed by GPUs on tensor data that are not necessarily reductive of the tensor data. The result of such an operation may be much smaller than the tensor(s) used as input, but the result may not necessarily represent a summarized form of the values of the tensor inputs, and thus the operation may be considered non-reductive. For example, a GPU may be used to compare the individual values in one tensor to the individual values in another tensor, and the result may indicate "yes" or "no" or some degree of similarity. As another example, a GPU may be used to determine whether the average value in a tensor is above or below a particular threshold. The results of such operations may be used for the analysis 1270, e.g., to determine whether tensors or other data associated with model training satisfy particular assertions. As shown in FIG. 19, the code injection 1705 may be used to inject a non-reductive operator into one or more GPUs 1710A-1710Z. For example, the code injection 1705 may cause the GPU 1710A to perform a non-reductive operation 1920A on the full tensor data 1716A and produce a result 1925A that is smaller in size than the full tensor data. Similarly, the code injection 1705 may cause the GPU 1710Z to perform a non-reductive operation 1920Z on the full tensor data 1716Z and produce a result 1925Z that is smaller in size than the full tensor data. The results 1925A-1925Z may be provided to the analysis system 1270 and used for automated analysis of the model training process. In some embodiments, the particular operators 1920A-1920Z may be selected according to particular rules that are sought to be evaluated using the rule evaluation 1272. For example, if the rule evaluation 1272 seeks to compare one tensor against another tensor, then a comparison operator may be selected for execution using one or more of the GPUs 1710A-1710Z.

Figure 20:
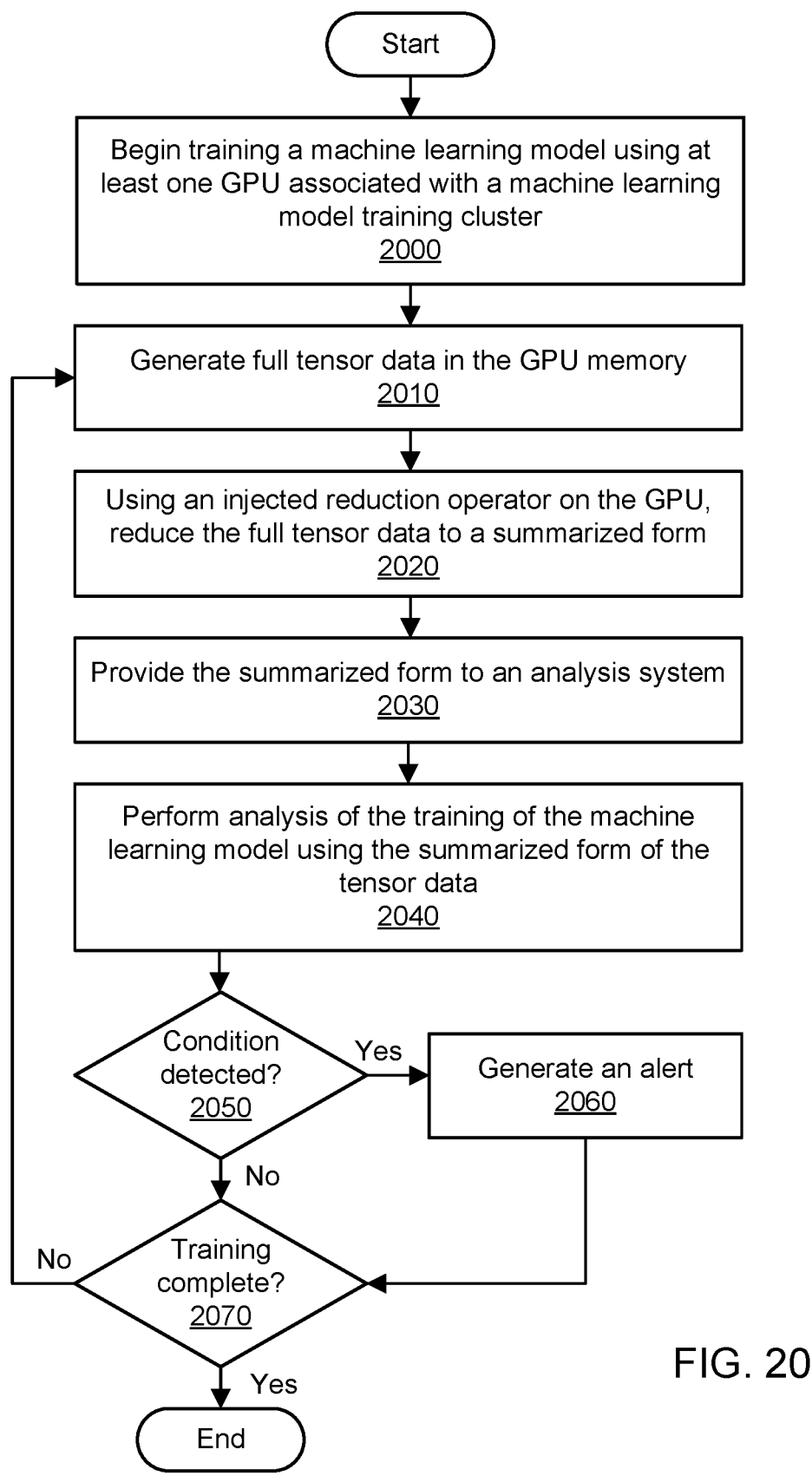
FIG. 20 is a flowchart illustrating a method for GPU code injection to summarize machine learning training data, according to some embodiments.

FIG. 20 is a flowchart illustrating a method for GPU code injection to summarize machine learning training data, according to some embodiments. As shown in 2000, the training of a machine learning model may be initiated. The training may use a cluster of computing devices (one or more hosts). The cluster may include one or more graphics processing units (GPUs). The training process may employ general-purpose GPU computing (GPGPU) techniques to take advantage of the parallelism offered by GPUs. In various embodiments, the GPUs may be physically coupled to or included in the hosts or may instead represent remote "elastic" GPUs that are provided by a GPU virtualization service and accessed by the hosts via a network. The GPUs may be used to process and store tensors associated with model training.

As shown in 2010, a GPU may generate and store (in GPU memory) a full set of tensor data during a particular step of the model training process. Some tensors used by the training process may include tens, hundreds, or thousands of dimensions. For such tensors, the number of individual values may be very large (e.g., millions). As shown in 2020, the full tensor data may be reduced to a summarized form using an injected reduction operator. Using code injection, a reduction operator may be provided to a GPU for execution using GPU resources, or an existing reduction operator of the GPU may be invoked. For example, a reduction operator may produce the minimum value of a full set of tensor data, the maximum value of a full set of tensor data, the average value of a full set of tensor data, and so on. By performing the reduction on the GPU, a much smaller set of tensor data (e.g., a single value) may be output by the GPU instead of thousands or millions of individual values.

As shown in 2030, the summarized form of the tensor data may be provided to an analysis system. As shown in 2040, analysis may be performed using the summarized form of the tensor data by the analysis system. The analysis may include rule evaluation. The rules may represent assertions about the state of the training process, e.g., such that a particular rule may be matched if a particular value in the captured data exceeds a threshold. In some embodiments, custom rules may be provided by users and evaluated by the analysis system. In some embodiments, a set of default rules may be evaluated. The default rules for debugging may represent common problems with model training such as exploding gradients, vanishing gradients, data distribution changes in the training data from step to step or batch to batch, data distribution changes in the training data from host to host, overflow conditions, underflow conditions, BatchNorm instability, and so on.

As shown in 2050, the method may determine whether a problem or condition was detected with the training, e.g., if one or more rules indicating problems or conditions were matched. If a problem or condition was detected, then as shown in 2060, an alarm may be generated. Alarms may describe detected problems or conditions with machine learning model training or training data. An alarm may indicate, for example, the type of problem or condition, the date or window of time in which the problem or condition was encountered, a model identifier, a model version number, a container identifier, a cluster identifier, a host identifier, problematic tensor data or a summary thereof, and/or other information useful to identify and remediate a problem with machine learning training. An alarm regarding a model training process may be raised before excessive resources have been used in the training, e.g., for a model that is not converging. Accordingly, based (at least in part) on an alarm, the training may be interrupted or discontinued in order to conserve resources of the cluster. Based (at least in part) on an alarm, the cluster may be deprovisioned or its use otherwise halted. Based (at least in part) on an alarm, the model training may be modified to remediate the detected problem(s) and then restarted for improved training. Based (at least in part) on an alarm, root cause analysis may be performed to determine the root causes of detected problems in the model training. As shown in 2070, the method may determine whether the training is complete. If so, then the method may end. If not, then the method may continue with the operation shown in 2010.

Illustrative Computer System

In at least some embodiments, a computer system that implements a portion or all of one or more of the technologies described herein may include a computer system that includes or is configured to access one or more computer-readable media. FIG. 21 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 21 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

The foregoing may be better understood in view of the following clauses:

Clause 1. A system, comprising:
one or more computing devices configured to implement a machine learning training cluster, wherein the machine learning training cluster is configured to:
train a machine learning model; and
collect data associated with training of the machine learning model on the one or more computing devices, wherein the data associated with the training of the machine learning model is collected using agent software on the one or more computing devices, and wherein the data associated with the training of the machine learning model comprises tensor-level numerical values; and
one or more computing devices configured to implement a machine learning analysis system, wherein the machine learning analysis system is configured to:
aggregate the data associated with the training of the machine learning model;
perform an analysis of aggregated data associated with the training of the machine learning model, wherein the analysis of the aggregated data comprises evaluation of one or more rules;
detect one or more problems associated with the training of the machine learning model based at least in part on the analysis of the aggregated data; and
generate one or more alarms describing the one or more problems associated with the training of the machine learning model.

Clause 2. The system as recited in clause 1, wherein the one or more problems associated with the training of the machine learning model comprise a discrepancy in data distributions across a plurality of batches or across two or more of the computing devices of the machine learning training cluster.

Clause 3. The system as recited in clause 1, wherein the one or more problems associated with the training of the machine learning model comprise a vanishing gradient or an exploding gradient detected in tensor-level data.

Clause 4. The system as recited in clause 1, wherein the training of the machine learning model is discontinued based at least in part on the one or more problems associated with the training of the machine learning model.

Clause 5. A computer-implemented method, comprising:
receiving, by a machine learning analysis system, data associated with training of a machine learning model, wherein the data associated with the training of the machine learning model is collected by one or more computing devices of a machine learning training cluster;
performing, by the machine learning analysis system, an analysis of the data associated with the training of the machine learning model;
detecting, by the machine learning analysis system, one or more conditions associated with the training of the machine learning model based at least in part on the analysis; and
generating, by the machine learning analysis system, one or more alarms describing the one or more conditions associated with the training of the machine learning model.

Clause 6. The method as recited in clause 5, wherein the data associated with the training of the machine learning model comprises tensor data output from one or more graphics processing units (GPUs) of the machine learning training cluster, and wherein the data associated with the training of the machine learning model is aggregated prior to the analysis of the data associated with the training of the machine learning model.

Clause 7. The method as recited in clause 5, wherein the one or more conditions associated with the training of the machine learning model comprise a discrepancy in data distributions across a plurality of batches.

Clause 8. The method as recited in clause 5, wherein the one or more conditions associated with the training of the machine learning model comprise a discrepancy in data distributions across two or more of the computing devices of the machine learning training cluster.

Clause 9. The method as recited in clause 5, wherein the one or more conditions associated with the training of the machine learning model comprise a vanishing gradient or an exploding gradient detected in tensor-level data.

Clause 10. The method as recited in clause 5, wherein the one or more conditions associated with the training of the machine learning model comprise an overflow or an underflow detected in tensor-level data.

Clause 11. The method as recited in clause 5, wherein the data associated with the training of the machine learning model comprises data describing resource utilization of the machine learning training cluster, and wherein the one or more conditions associated with the training of the machine learning model represent a violation of one or more resource utilization thresholds.

Clause 12. The method as recited in clause 5, wherein the data associated with the training of the machine learning model comprises data describing resource utilization of the machine learning training cluster, and wherein the one or more conditions associated with the training of the machine learning model represent one or more performance bottlenecks identified in one or more resources of the machine learning training cluster.

Clause 13. The method as recited in clause 5, further comprising:
discontinuing the training of the machine learning model based at least in part on the one or more conditions associated with the training of the machine learning model;
modifying a configuration of the training of the machine learning model; and
restarting the training of the machine learning model according to the configuration.

Clause 14. The method as recited in clause 5, further comprising:
discontinuing use of the machine learning training cluster based at least in part on the one or more conditions associated with the training of the machine learning model.

Clause 15. One or more non-transitory computer-readable storage media storing program instructions that, when executed on or across one or more processors, perform:
receiving, by a machine learning analysis system, data associated with training of a machine learning model, wherein the data associated with the training of the machine learning model is collected by one or more computing devices of a machine learning training cluster, and wherein the data associated with the training of the machine learning model comprises tensor-level data;

performing, by the machine learning analysis system, an analysis of the data associated with the training of the machine learning model, wherein the analysis comprises rule evaluation;

detecting, by the machine learning analysis system, one or more problems associated with the training of the machine learning model based at least in part on the rule evaluation; and generating, by the machine learning analysis system, one or more alarms describing the one or more problems associated with the training of the machine learning model.

Clause 16. The one or more non-transitory computer-readable storage media as recited in clause 15, wherein the one or more problems associated with the training of the machine learning model comprise a discrepancy in data distributions across a plurality of batches.

Clause 17. The one or more non-transitory computer-readable storage media as recited in clause 15, wherein the one or more problems associated with the training of the machine learning model comprise a discrepancy in data distributions across two or more of the computing devices.

Clause 18. The one or more non-transitory computer-readable storage media as recited in clause 15, wherein the one or more problems associated with the training of the machine learning model comprise a vanishing gradient or an exploding gradient detected in tensor-level data.

Clause 19. The one or more non-transitory computer-readable storage media as recited in clause 15, wherein the data associated with the training of the machine learning model comprises data describing resource utilization of the machine learning training cluster, and wherein the one or more problems associated with the training of the machine learning model represent a violation of one or more resource utilization thresholds.

Clause 20. The one or more non-transitory computer-readable storage media as recited in clause 15, further comprising additional program instructions that, when executed on or across the one or more processors, perform:

discontinuing the training of the machine learning model based at least in part on the one or more problems associated with the training of the machine learning model.

Additionally, the foregoing may be better understood in view of the following clauses:

Clause 21. A system, comprising:
one or more computing devices configured to implement a machine learning training cluster, wherein the machine learning training cluster is configured to:
initiate training of a machine learning model using a graphics processing unit (GPU), wherein the training of the machine learning model generates tensor data in a memory of the GPU; and
inject a reduction operator into the GPU, wherein a summary of the tensor data is calculated by the GPU using the reduction operator, wherein the summary of the tensor data is smaller in size than the tensor data, and wherein the summary of the tensor data is output by the GPU; and
one or more computing devices configured to implement a machine learning analysis system, wherein the machine learning analysis system is configured to:
receive the summary of the tensor data;
perform an analysis of the training of the machine learning model based at least in part on the summary of the tensor data, wherein the analysis of the training of the machine learning model comprises evaluation of one or more rules;
detect one or more conditions associated with the training of the machine learning model based at least in part on the analysis of the training of the machine learning model; and
generate one or more alarms describing the one or more conditions associated with the training of the machine learning model.

Clause 22. The system as recited in clause 21, wherein the reduction operator represents a minimum, a maximum, or an average of the tensor data.

Clause 23. The system as recited in clause 21, wherein the tensor data is not output by the GPU and not provided by the machine learning training cluster to the machine learning analysis system.

Clause 24. The system as recited in clause 21, wherein the tensor data is output by the GPU, and wherein the analysis of the training of the machine learning model is performed based at least in part on the tensor data.

Clause 25. A computer-implemented method, comprising:
initiating training of a machine learning model using a graphics processing unit (GPU) associated with a machine learning training cluster, wherein the training of the machine learning model generates tensor data in a memory of the GPU; and
determining, by the GPU, a result of an operation on the tensor data, wherein the result of the operation on the tensor data is smaller in size than the tensor data, and wherein the result of the operation on the tensor data is output by the GPU;
performing, by a machine learning analysis system, an analysis of the training of the machine learning model based at least in part on the result of the operation on the tensor data; and
detecting, by the machine learning analysis system, one or more conditions associated with the training of the machine learning model based at least in part on the analysis of the training of the machine learning model.

Clause 26. The method as recited in clause 25, wherein the operation represents a minimum, a maximum, or an average of the tensor data.

Clause 27. The method as recited in clause 25, wherein the tensor data is not output by the GPU.

Clause 28. The method as recited in clause 25, wherein the tensor data is output by the GPU, and wherein the analysis of the training of the machine learning model is performed based at least in part on the tensor data.

Clause 29. The method as recited in clause 25, further comprising:
generating, by the machine learning analysis system, one or more alarms describing the one or more conditions associated with the training of the machine learning model.

Clause 30. The method as recited in clause 25, wherein the one or more conditions associated with the training of the machine learning model comprise a discrepancy in data distributions across a plurality of batches or across two or more computing devices of the machine learning training cluster.

Clause 31. The method as recited in clause 25, wherein the one or more conditions associated with the training of the machine learning model comprise a vanishing gradient or an exploding gradient detected using the summary of the tensor data.

Clause 32. The method as recited in clause 25, wherein the operation comprises a comparison of the tensor data to a predetermined threshold value or a comparison between two tensors.

Clause 33. One or more non-transitory computer-readable storage media storing program instructions that, when executed on or across one or more processors, perform:
   initiating training of a machine learning model using a graphics processing unit (GPU) associated with a machine learning training cluster, wherein the training of the machine learning model generates tensor data in a memory of the GPU; and
   determining, by the GPU, aggregate summary of the tensor data according to a reduction operator injected into the GPU, wherein the summary of the tensor data is smaller in size than the tensor data, and wherein the summary of the tensor data is output by the GPU;
   receiving, by a machine learning analysis system, the summary of the tensor data;
   performing, by the machine learning analysis system, an analysis of the training of the machine learning model based at least in part on the summary of the tensor data;
   detecting, by the machine learning analysis system, one or more conditions associated with the training of the machine learning model based at least in part on the analysis of the training of the machine learning model; and
   generating, by the machine learning analysis system, one or more alarms describing the one or more conditions associated with the training of the machine learning model.

Clause 34. The one or more non-transitory computer-readable storage media as recited in clause 33, wherein the reduction operator represents a minimum, a maximum, or an average of the tensor data.

Clause 35. The one or more non-transitory computer-readable storage media as recited in clause 33, wherein the tensor data is not output by the GPU and not provided by the machine learning training cluster to the machine learning analysis system.

Clause 36. The one or more non-transitory computer-readable storage media as recited in clause 33, wherein the tensor data is output by the GPU, and wherein the analysis of the training of the machine learning model is performed based at least in part on the tensor data.

Clause 37. The one or more non-transitory computer-readable storage media as recited in clause 33, wherein the one or more conditions associated with the training of the machine learning model comprise a discrepancy in data distributions across a plurality of batches or across two or more computing devices of the machine learning training cluster.

Clause 38. The one or more non-transitory computer-readable storage media as recited in clause 33, wherein the one or more conditions associated with the training of the machine learning model comprise a vanishing gradient or an exploding gradient detected using the summary of the tensor data.

Clause 39. The one or more non-transitory computer-readable storage media as recited in clause 33, further comprising additional program instructions that, when executed on or across the one or more processors, perform:
   discontinuing the training of the machine learning model based at least in part on the one or more conditions associated with the training of the machine learning model.

Clause 40. The one or more non-transitory computer-readable storage media as recited in clause 33, further comprising additional program instructions that, when executed on or across the one or more processors, perform:
   discontinuing use of the machine learning training cluster based at least in part on the one or more conditions associated with the training of the machine learning model.

What is claimed is:

1. A system, comprising:
   one or more computing devices configured to implement a machine learning training cluster, wherein the machine learning training cluster is configured to:
      initiate training of a machine learning model using a graphics processing unit (GPU), wherein the training of the machine learning model generates tensor data in a memory of the GPU; and
      inject a reduction operator into the GPU, wherein a summary of the tensor data is calculated by the GPU using the reduction operator, wherein the summary of the tensor data is smaller in size than the tensor data, and wherein the summary of the tensor data is output by the GPU; and
   one or more computing devices configured to implement a machine learning analysis system, wherein the machine learning analysis system is configured to:
      receive the summary of the tensor data;
      perform an analysis of the training of the machine learning model based at least in part on the summary of the tensor data, wherein the analysis of the training of the machine learning model comprises evaluation of one or more rules;
      detect one or more conditions associated with the training of the machine learning model based at least in part on the analysis of the training of the machine learning model; and
      generate one or more alarms describing the one or more conditions associated with the training of the machine learning model.

2. The system as recited in claim 1, wherein the reduction operator represents a minimum, a maximum, or an average of the tensor data.

3. The system as recited in claim 1, wherein the tensor data is not output by the GPU and not provided by the machine learning training cluster to the machine learning analysis system.

4. The system as recited in claim 1, wherein the tensor data is output by the GPU, and wherein the analysis of the training of the machine learning model is performed based at least in part on the tensor data.

5. A computer-implemented method, comprising:
   initiating training of a machine learning model using a graphics processing unit (GPU) associated with a machine learning training cluster, wherein the training of the machine learning model generates tensor data in a memory of the GPU; and
   determining, by the GPU, a result of an operation on the tensor data, wherein the result of the operation on the tensor data is smaller in size than the tensor data, and wherein the result of the operation on the tensor data is output by the GPU;

performing, by a machine learning analysis system, an analysis of the training of the machine learning model based at least in part on the result of the operation on the tensor data; and detecting, by the machine learning analysis system, one or more conditions associated with the training of the machine learning model based at least in part on the analysis of the training of the machine learning model.

6. The method as recited in claim 5, wherein the operation represents a minimum, a maximum, or an average of the tensor data.

7. The method as recited in claim 5, wherein the tensor data is not output by the GPU.

8. The method as recited in claim 5, wherein the tensor data is output by the GPU, and wherein the analysis of the training of the machine learning model is performed based at least in part on the tensor data.

9. The method as recited in claim 5, further comprising:
generating, by the machine learning analysis system, one or more alarms describing the one or more conditions associated with the training of the machine learning model.

10. The method as recited in claim 5, wherein the one or more conditions associated with the training of the machine learning model comprise a discrepancy in data distributions across a plurality of batches or across two or more computing devices of the machine learning training cluster.

11. The method as recited in claim 5, wherein the one or more conditions associated with the training of the machine learning model comprise a vanishing gradient or an exploding gradient detected using the summary of the tensor data.

12. The method as recited in claim 5, wherein the operation comprises a comparison of the tensor data to a predetermined threshold value or a comparison between two tensors.

13. One or more non-transitory computer-readable storage media storing program instructions that, when executed on or across one or more processors, perform:
initiating training of a machine learning model using a graphics processing unit (GPU) associated with a machine learning training cluster, wherein the training of the machine learning model generates tensor data in a memory of the GPU; and
determining, by the GPU, aggregate summary of the tensor data according to a reduction operator injected into the GPU, wherein the summary of the tensor data is smaller in size than the tensor data, and wherein the summary of the tensor data is output by the GPU;
receiving, by a machine learning analysis system, the summary of the tensor data;
performing, by the machine learning analysis system, an analysis of the training of the machine learning model based at least in part on the summary of the tensor data;

detecting, by the machine learning analysis system, one or more conditions associated with the training of the machine learning model based at least in part on the analysis of the training of the machine learning model; and generating, by the machine learning analysis system, one or more alarms describing the one or more conditions associated with the training of the machine learning model.

14. The one or more non-transitory computer-readable storage media as recited in claim 13, wherein the reduction operator represents a minimum, a maximum, or an average of the tensor data.

15. The one or more non-transitory computer-readable storage media as recited in claim 13, wherein the tensor data is not output by the GPU and not provided by the machine learning training cluster to the machine learning analysis system.

16. The one or more non-transitory computer-readable storage media as recited in claim 13, wherein the tensor data is output by the GPU, and wherein the analysis of the training of the machine learning model is performed based at least in part on the tensor data.

17. The one or more non-transitory computer-readable storage media as recited in claim 13, wherein the one or more conditions associated with the training of the machine learning model comprise a discrepancy in data distributions across a plurality of batches or across two or more computing devices of the machine learning training cluster.

18. The one or more non-transitory computer-readable storage media as recited in claim 13, wherein the one or more conditions associated with the training of the machine learning model comprise a vanishing gradient or an exploding gradient detected using the summary of the tensor data.

19. The one or more non-transitory computer-readable storage media as recited in claim 13, further comprising additional program instructions that, when executed on or across the one or more processors, perform:
discontinuing the training of the machine learning model based at least in part on the one or more conditions associated with the training of the machine learning model.

20. The one or more non-transitory computer-readable storage media as recited in claim 13, further comprising additional program instructions that, when executed on or across the one or more processors, perform:
discontinuing use of the machine learning training cluster based at least in part on the one or more conditions associated with the training of the machine learning model.

* * * * *